(12) United States Patent
Wu et al.

(10) Patent No.: US 10,863,519 B2
(45) Date of Patent: Dec. 8, 2020

(54) WIRELESS COMMUNICATION METHOD AND WIRELESS COMMUNICATION DEVICE

(71) Applicants: Liang Wu, Jiangsu (CN); Zaichen Zhang, Jiangsu (CN); Lili Zheng, Jiangsu (CN); Weiwei Qin, Jiangsu (CN); Jian Dang, Jiangsu (CN); Penshun Lu, Beijing (CN)

(72) Inventors: Liang Wu, Jiangsu (CN); Zaichen Zhang, Jiangsu (CN); Lili Zheng, Jiangsu (CN); Weiwei Qin, Jiangsu (CN); Jian Dang, Jiangsu (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 16/310,486

(22) PCT Filed: May 26, 2017

(86) PCT No.: PCT/CN2017/086063
§ 371 (c)(1),
(2) Date: Dec. 17, 2018

(87) PCT Pub. No.: WO2017/219825
PCT Pub. Date: Dec. 28, 2017

(65) Prior Publication Data
US 2019/0335472 A1    Oct. 31, 2019

(30) Foreign Application Priority Data

Jun. 24, 2016   (CN) .......................... 2016 1 0474664

(51) Int. Cl.
*H04W 72/08*  (2009.01)
*H04B 7/0404* (2017.01)
*H04W 64/00*  (2009.01)

(52) U.S. Cl.
CPC ........ *H04W 72/082* (2013.01); *H04B 7/0404* (2013.01); *H04W 64/00* (2013.01)

(58) Field of Classification Search
None
See application file for complete search history.

(56) References Cited

U.S. PATENT DOCUMENTS

2008/0318596 A1* 12/2008 Tenny ................... G01S 5/0242
                                                            455/456.2
2013/0005269 A1*  1/2013 Lindoff ................. H04W 36/20
                                                             455/63.1
(Continued)

FOREIGN PATENT DOCUMENTS

CN   104703212 A   6/2015
CN   104811946 A   7/2015
(Continued)

OTHER PUBLICATIONS

English language translation of International Search Report for International application No. PCT/CN2017/086063, dated Jul. 26, 2017.

*Primary Examiner* — Alex Skripnikov
(74) *Attorney, Agent, or Firm* — Xsensus, LLP

(57) ABSTRACT

A wireless communication method and device. The method includes receiving location information from one or more terminals served by a first base station, and identifying, according to the received location information, a first terminal located within the coverage range of the first base station and proximate to the coverage range of at least one second base station, the first terminal served by the first base station being capable of receiving an interference signal from the at least one second base station, and a second terminal served by a corresponding second base station and distant from the coverage range of the first base station existing within the coverage range of each of the at least one
(Continued)

second base station. There is a cooperating with the at least one second base station to determine a downlink transmission mode for the first terminal.

17 Claims, 8 Drawing Sheets

(56) References Cited

U.S. PATENT DOCUMENTS

2016/0308589 A1* 10/2016 Jalloul ................ H04L 25/0228
2017/0033916 A1* 2/2017 Stirling-Gallacher .... H04L 5/14

FOREIGN PATENT DOCUMENTS

| CN | 104956610 A | 9/2015 |
| CN | 105264800 A | 1/2016 |
| CN | 105407474 A | 3/2016 |
| CN | 105592552 A | 5/2016 |

* cited by examiner

FIG. 2

| | time slot | eNB1 | eNB2 | UE1 mode | UE2 mode |
|---|---|---|---|---|---|
| part 1 | 1 | $u_1$ | $v_1$ | 1 | 1 |
| | 2 | $u_1$ | $v_2$ | 2 | 1 |
| | 3 | $u_2$ | $v_3$ | 1 | 1 |
| | 4 | $u_2$ | $v_4$ | 2 | 1 |
| | 5 | $u_3$ | $v_1$ | 1 | 2 |
| | 6 | $u_3$ | $v_2$ | 2 | 2 |
| | 7 | $u_4$ | $v_3$ | 1 | 2 |
| | 8 | $u_4$ | $v_4$ | 2 | 2 |
| | 9 | $u_5$ | $k_1v_1+k_2v_3$ | 1 | 3 |
| | 10 | $u_5$ | $k_3v_2+k_4v_4$ | 2 | 3 |
| part 2 | 11 | | $v_1$ | 1 | 4 |
| | 12 | | $v_2$ | 2 | 4 |
| | 13 | | $v_3$ | 1 | 5 |
| | 14 | | $v_4$ | 2 | 5 |

FIG. 3

| | time slot | eNB1 | eNB2 | eNB3 | UE1 mode | UE2 mode | UE3 mode |
|---|---|---|---|---|---|---|---|
| part 1 | 1 | $u_1$ | $v_1$ | $w_1$ | 1 | 1 | 1 |
| | 2 | $u_1$ | $v_2$ | $w_2$ | 2 | 1 | 1 |
| | 3 | $u_2$ | $v_3$ | $w_3$ | 1 | 1 | 1 |
| | 4 | $u_2$ | $v_4$ | $w_4$ | 2 | 1 | 1 |
| | ... | ... | ... | ... | ... | ... | ... |
| | 18 | $u_9$ | $v_{18}$ | $w_{18}$ | 2 | 1 | 1 |
| | 19 | $u_{10}$ | $v_{19}$ | $k_1w_1+k_2w_3+k_3w_5$ | 1 | 1 | 2 |
| | 20 | $u_{10}$ | $v_{20}$ | $k_4w_2+k_5w_4+k_6w_6$ | 2 | 1 | 2 |
| | 21 | $u_{11}$ | $p_1v_1+p_2v_3$ | $k_7w_7+k_8w_9+k_9w_{11}$ | 1 | 2 | 2 |
| | 22 | $u_{11}$ | $p_3v_2+p_4v_4$ | $k_{10}w_8+k_{11}w_{10}+k_{12}w_{12}$ | 2 | 2 | 2 |
| | 23 | $u_{12}$ | $p_5v_5+p_6v_7$ | $k_{13}w_{13}+k_{14}w_{15}+k_{15}w_{17}$ | 1 | 2 | 2 |
| | 24 | $u_{12}$ | $p_7v_6+p_8v_8$ | $k_{16}w_{14}+k_{17}w_{16}+k_{18}w_{18}$ | 2 | 2 | 2 |
| | 25 | $u_{13}$ | $p_9v_9+p_{10}v_{11}$ | $k_{19}w_1+k_{20}w_3+k_{21}w_5$ | 1 | 2 | 2 |
| | ... | ... | ... | ... | ... | ... | ... |
| | 30 | $u_{15}$ | $p_{19}v_{18}+p_{20}v_{20}$ | $k_{34}w_{14}+k_{35}w_{16}+k_{36}w_{18}$ | 2 | 2 | 2 |
| part 2 | 31 | | $v_1$ | | 1 | 3 | |
| | 32 | | $v_2$ | | 2 | 3 | |
| | 33 | | $v_3$ | | 1 | 4 | |
| | 34 | | $v_4$ | | 2 | 4 | |
| | 35 | | $v_5$ | | 1 | 3 | |
| | ... | | ... | | ... | ... | |
| | 50 | | $v_{20}$ | | 2 | 4 | |
| part 3 | 51 | | | $w_1$ | 1 | | 3 |
| | 52 | | | $w_2$ | 2 | | 3 |
| | 53 | | | $w_3$ | 1 | | 4 |
| | 54 | | | $w_4$ | 2 | | 4 |
| | 55 | | | $w_5$ | 1 | | 5 |
| | 56 | | | $w_6$ | 2 | | 5 |
| | 57 | | | $w_7$ | 1 | | 3 |
| | ... | | | ... | ... | | ... |
| | 68 | | | $w_{18}$ | 2 | | 5 |

WIRELESS COMMUNICATION METHOD AND WIRELESS COMMUNICATION DEVICE

CROSS-REFERENCE TO RELATED APPLICATIONS

This application is a National Stage Application based on PCT/CN2017/086063, filed on 26 May 2017, and claims priority to Chinese Patent Application No. 201610474664.0, filed on 24 Jun. 2016, the entire contents of which being incorporated herein by reference.

FIELD

The present disclosure relates to a wireless communication method and a wireless communication device, and in particular, to a communication method and associated device for performing interference cancellation (such as blind interference alignment) in an asymmetric channel scenario.

BACKGROUND

With the continuous development of mobile communication technology, Blind Interference Alignment (BIA) technology is receiving more and more attention as an interference cancellation technology.

The interference alignment technology performs precoding at a transmission end, so that interference signals may overlap one another at a reception end and thereby occupy a smaller signal subspace. Therefore, more signal space may be used for transmitting useful data. However, the conventional interference alignment technology usually requires that the transmission end grasp channel state information, which is often difficult to be met in practical applications and also causes additional overhead. In this situation, the Blind Interference Alignment (BIA) technology has been developed. The BIA technology is an interference alignment technology which does not require the transmission end to have the channel state information.

A BIA technology based on interleaved antenna selection is known, in which a receiving device utilizes pattern reconfigurable antennas to receive signals. The pattern reconfigurable antenna is an antenna of which the electronic and radiation characteristics can be dynamically changed. When the pattern reconfigurable antenna operates in different antenna modes, transmission channels for the received signals can be considered to be independently and identically distributed, that is, channel coefficients have the same distribution characteristics but are independent from one another. In the BIA technology based on interleaved antenna selection, the receiving device employs the corresponding antenna mode to receive signal in each time slot, and respective receiving devices do not simultaneously switch an operation mode of the receiving antenna.

However, the conventional technology has not proposed a BIA method for improving communication performance for cell-edge users in asymmetric channels. The asymmetric channel state refers to that channel conditions for respective terminal users are asymmetric. For example, in a channel scenario where interference exists, the asymmetric channel state may refer to a state in which some terminal user may be subjected to interference from neighboring base stations when receiving downlink signal from serving base station, while the reception of other terminal users may not be interfered.

In addition, in the conventional BIA technology based on interleaved antenna selection, it is generally required that respective receiving devices (terminals) have the same number of antennas, which has a great limitation in the practical application.

SUMMARY OF THE INVENTION

In order to solve the above problem, the present disclosure proposes a BIA technology adapted to the asymmetric channel scenario, and the technology has no limitation on the number of antennas of respective terminal devices. Therefore, the present disclosure has wider applicability.

According to an aspect of the present disclosure, there is provided an electronic device for facilitating interference cancellation, comprising processing circuitry configured to: recognize a first terminal located within coverage of a first base station and adjacent to coverage of at least one second base station based on position information from one or more terminals served by the first base station, wherein the first terminal served by the first base station can receive an interference signal from the at least one second base station, and wherein a second terminal exists within coverage of each of the at least one second base station, the second terminal being served by the corresponding second base station and away from the coverage of the first base station; and perform control to cooperate with the at least one second base station, so as to determine a downlink transmission manner for the first terminal, such that the first terminal can receive a signal by performing interference cancellation.

According to another aspect of the present invention, there is provided an apparatus for facilitating interference cancellation, comprising: a plurality of antennas configured to transmit and receive signals; and processing circuitry configured to: recognize a first terminal located within coverage of a first base station and adjacent to coverage of at least one second base station based on position information from one or more terminals served by the first base station, wherein the first terminal served by the first base station can receive an interference signal from the at least one second base station, and wherein a second terminal exists within coverage of each of the at least one second base station, the second terminal being served by the corresponding second base station and away from the coverage of the first base station; and perform control to cooperate with the at least one second base station, so as to determine a downlink transmission manner for the first terminal, such that the first terminal can receive a signal by performing interference cancellation.

According to another aspect of the present invention, there is provided a method performed by a first base station for facilitating interference cancellation, comprising: receiving position information from one or more terminals served by the first base station; recognizing a first terminal located within coverage of the first base station and adjacent to coverage of at least one second base station based on the received position information, wherein the first terminal served by the first base station can receive an interference signal from the at least one second base station, and wherein a second terminal exists within coverage of each of the at least one second base station, the second terminal being served by the corresponding second base station and away from the coverage of the first base station; and cooperating with the at least one second base station, so as to determine a downlink transmission manner for the first terminal, such that the first terminal can receive a signal by performing interference cancellation.

According to another aspect of the present invention, there is provided an electronic device for interference cancellation, comprising processing circuitry configured to: perform control to report, to a first base station serving a first terminal, position information and a number of antennas of the first terminal; and determine a reception manner to be used by the first terminal and control the first terminal to perform interference cancellation processing, according to indication information from the first base station, wherein the indication information is generated by the first base station based on at least the position information and the number of antennas of the first terminal, wherein the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station.

According to another aspect of the present invention, there is provided an apparatus for interference cancellation, comprising: a plurality of antennas configured to be capable of transmitting and receiving signals in a plurality of antenna modes; and processing circuitry configured to: perform control to report, to a first base station serving a first terminal, position information and a number of antennas of the first terminal; and determine a reception manner to be used by the first terminal and control the first terminal to perform interference cancellation processing, according to indication information from the first base station, wherein the indication information is generated by the first base station based on at least the position information and the number of antennas of the first terminal, wherein the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station.

According to another aspect of the present invention, there is provided a method performed by a first terminal for interference cancellation, comprising: reporting, to a first base station serving the first terminal, position information and a number of antennas of the first terminal; receiving indication information from the first base station; and determining a reception manner to be used by the first terminal and performing interference cancellation processing, according to the indication information, wherein the indication information is generated by the first base station based on at least the position information and the number of antennas of the first terminal, wherein the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station.

BRIEF DESCRIPTION OF THE DRAWINGS

The present disclosure may be better understood by referring to the following description provided in conjunction with the accompanying drawings, in which, the same or similar reference numerals are used throughout the accompanying drawings to indicate the same or similar components. The accompanying drawings together with the following detailed description are included in the present specification and form a part of the present specification, and are used to further illustrate preferred embodiments of the present disclosure and explain principles and advantages of the present disclosure. In the accompanying drawing:

FIG. 2 shows a schematic example of transmission and reception schemes in a two-cell asymmetric channel scenario;

FIG. 3 shows a schematic example of transmission and reception schemes in a three-cell asymmetric channel scenario;

DETAILED DESCRIPTION OF EMBODIMENTS

Figure 1:
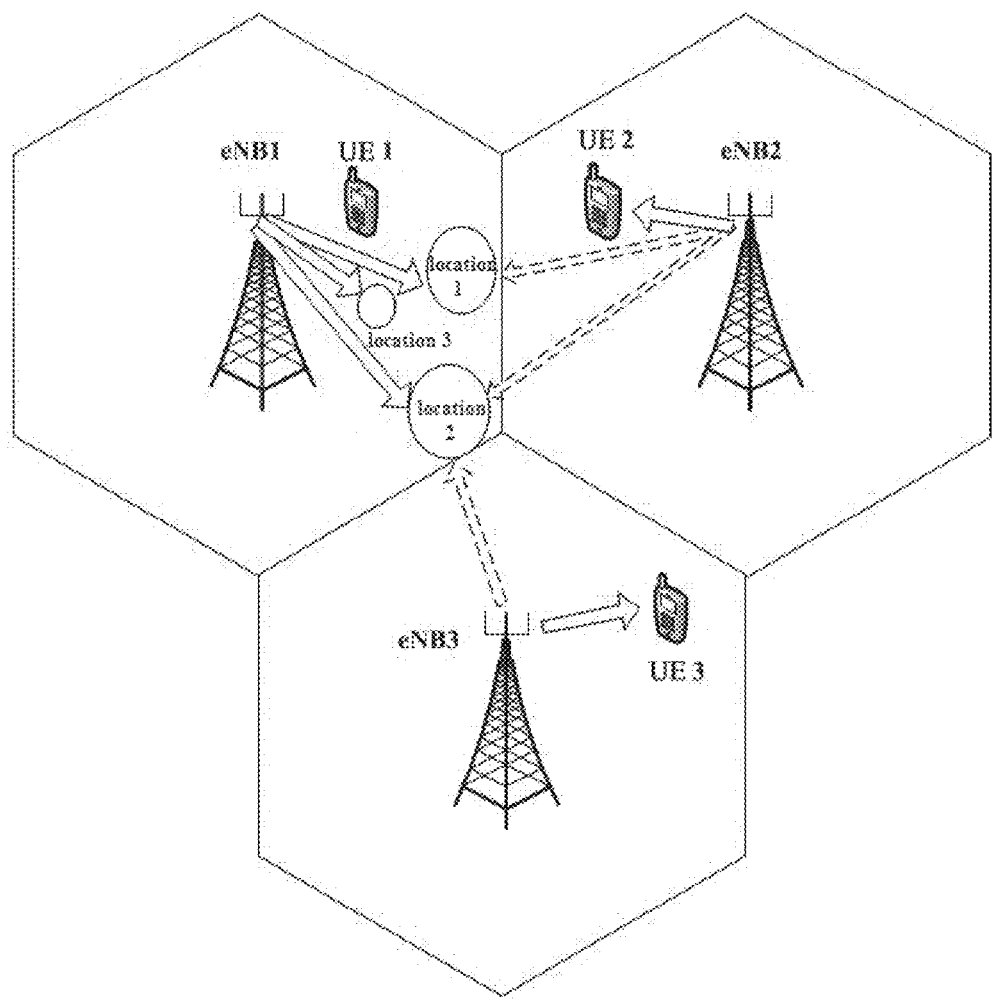
FIG. 1 is a schematic diagram showing an asymmetric channel scenario.

FIG. 1 shows a communication scenario of asymmetric channel to which the present disclosure is applied. In FIG. 1, three base stations eNB1, eNB2, eNB3, and terminal devices UE1, UE2, UE3 respectively served by respective base stations are schematically illustrated. Taking the base station eNB1 and the terminal device UE1 as an example, the terminal device UE1 is located at location 1 (shown by a circle) in the Figure, that is, within the coverage of the base station eNB1 (hereinafter referred to as "Cell 1"), and adjacent to the coverage of the base station eNB2 (hereinafter referred to as "Cell 2"). On the other hand, the terminal device UE2 is located inside the Cell 2 and away from Cell 1. In the case that the terminal devices UE1 and UE2 occupy the same time-frequency resource, the downlink transmission between the terminal device UE1 and the base station eNB1 will be interfered by the downlink transmission between the terminal device UE2 and the base station eNB2. On the contrary, the terminal device UE2 will not be interfered by the base station eNB1 due to being away from the coverage of the base station eNB1. In this case, Cell 1 and Cell 2 constitute a two-cell asymmetric channel. Similarly, when the terminal device UE1 is located at location 2 in the Figure, that is, near the boundary of coverage of three base stations, and the terminal devices UE2 and UE3 are respectively located inside Cell 2 and Cell 3, and away from Cell 1, if the terminal devices UE1, UE2, and UE3 occupy the same time-frequency resource, the terminal device UE1 will be interfered by the base stations eNB2 and eNB3, while the downlink transmission between the terminal devices UE2 and UE3 and their serving base stations will not be interfered by the base station eNB1. In this case, Cell 1, Cell 2 and Cell 3 constitute a three-cell asymmetric channel.

In the following description, it will be assumed that the base station eNBi (i=1, 2, 3) is equipped with Mi antennas, and the terminal device UEi (i=1, 2, 3) is equipped with Ni pattern reconfigurable antennas. Without loss of generality, taking the above three-cell asymmetric channel as an example, each of the pattern reconfigurable antennas of the terminal device UE1 has $\lfloor M_1/N_1 \rfloor+1$ preset antenna modes, each of the pattern reconfigurable antennas of the terminal device UE2 has $\lfloor M_2/N_2 \rfloor+N_2$ preset antenna modes, and each of the pattern reconfigurable antennas of the terminal device UE3 has $\lfloor M_3/N_3 \rfloor+N_3$ preset antenna modes. It should be noted that, in order to apply to the asymmetric channel scenario where the terminal device UE1 is located inside the cell (for example, at location 3 in FIG. 1) and the terminal device UE2 or UE3 is located at the boundary between the cells, it is more generally to configure each antenna of the terminal device UE1 to be capable of operating in $\lfloor M_1/N_1 \rfloor+N_1$ antenna modes. In the present disclosure, it is specified that $M_1>N_1$, $M_2 \geq 2N_2$, $M_3 \geq 2N_3$.

In the two-cell asymmetric channel scenario shown in FIG. 1, the signals $y_1(t)$ and $y_2(t)$ received by the terminal devices UE1 and UE2 in the t-th time slot can be respectively represented as $$y_1(t)=H_{11}(m_1(t))x_1(t)+H_{12}(m_1(t))x_2(t)+z_1(t)$$

$$y_2(t)=H_{22}(m_2(t))x_2(t)+z_2(t) \qquad (1)$$

where $x_j(t)$ is a $M_j \times 1$ signal vector transmitted by the j-th (j=1, 2) base station, $H_{ij}$ indicates a $N_i \times M_j$ channel matrix from the j-th base station to the i-th (i=1, 2) terminal device, and $m_i(t)$ indicates antenna mode of pattern reconfigurable antennas of the i-th terminal device, $z_i(t) \sim CN(0, I_{N_i})$ is complex Gaussian noise vector, where $I_{N_i}$ indicates an identity matrix with a rank of $N_i$.

$H_{12}$ indicates a channel matrix from the second base station (the base station eNB2) to the first terminal device (UE1), $H_{21}$ indicates a channel matrix from the first base station (the base station eNB1) to the second terminal device (UE2). Therefore, it can be seen from the equation (1) that, the received signal $y_1(t)$ of the terminal device UE1 includes an interference signal term $H_{12}(m_1(t))x_2(t)$ from the base station eNB2, while the received signal $y_2(t)$ of the terminal device UE2 does not include an interference signal from the base station eNB1.

In the above three-cell asymmetric channel scenario, the signals $y_1(t)$, $y_2(t)$ and $y_3(t)$ received by the terminal devices UE1, UE2 and UE3 in the t-th time slot can be respectively represented as:

$$y_1(t)=H_{11}(m_1(t))x_1(1)+H_{12}(m_1(t))x_2(t)+H_{13}(m_1(t))x_3(t)+z_1(t)$$

$$y_2(t)=H_{22}(m_2(t))x_2(t)+z_2(t)$$

$$y_3(t)=H_{33}(m_3(t))x_3(t)+z_3(t) \qquad (2)$$

where $x_j(t)$ indicates a signal vector transmitted by the j-th (j=1, 2, 3) base station, $H_{ij}$ indicates a $N_i \times M_1$ channel matrix from the j-th base station to the i-th (i=1, 2, 3) terminal device, $m_i(t)$ indicates an antenna mode of pattern reconfigurable antennas of the i-th terminal device, $z_i(t) \sim CN(0, I_{N_i})$ is complex Gaussian noise vector, where $I_{N_i}$ indicates an identity matrix with a rank of $N_i$.

It can be seen from the equation (2) that, the received signal $y_1(t)$ of the terminal device UE1 includes interference signals from the base stations eNB2 and eNB3, while the received signals of the terminal devices UE2 and UE3 do not include an interference signal from the base station eNB1.

For the above asymmetric channel scenario, the present disclosure proposes a solution capable of performing blind interference alignment. By jointly designing downlink transmission manners for a plurality of base stations, the solution enables a cell-edge terminal device to easily eliminate interference of neighboring base stations by signal processing when receiving signals.

The following describes the transmission scheme of the base stations eNB1, eNB2 and the corresponding reception scheme of the terminal devices UE1, UE2 in the two-cell asymmetric channel scenario according to the solution of the present disclosure. Similarly to the above description in connection with FIG. 1, it is assumed that the terminal device UE1 is interfered by the neighboring base station eNB2, while the terminal device UE2 is not interfered by the base station eNB1. In the present scheme, the base station eNB1 transmits $n_1=(M_2-N_2)$ signal vectors, and each of the signal vectors is repeatedly transmitted $r_1=\lfloor M_1/N_1 \rfloor+1$ times. The base station eNB2 transmits $n_2=r_1 N_2$ signal vectors, and each of the signal vectors is repeatedly transmitted $r_2=\lfloor M_2/N_2 \rfloor+1$ times. Further, in the present scheme, the overall transmission period is divided into two parts, the first part ("Part 1") includes a period of time from the first time slot to the $r_1 n_1$-th time slot, and the second part ("Part 2") includes a period of time from the $r_1 n_1+1$-th time slot to the $r_1 n_1+n_2$-th time slot.

First, the operation of each base station and terminal device in "Part 1" (the first time slot to the $r_1 n_1$-th time slot) will be described. The base station eNB1 and the terminal device UE1 perform the following operations in "Part 1": the base station eNB1 transmits all of $n_1$ signal vectors, each signal vector is repeatedly transmitted $r_1$ times and then the next signal vector is transmitted. As for one signal vector transmitted by the base station eNB1 (transmitted $r_1$ times), the terminal device UE1 receives it sequentially using antenna modes 1 to $r_1$, and then receives the next signal vector using antenna modes 1 to $r_1$.

For the base station eNB2 and the terminal device UE2, it performs the following operations in the former part (the first time slot to the $(r_2-2)n_2$-th time slot) of "Part 1": the base station eNB2 transmits all of $n_2$ signal vectors, each signal vector is transmitted once and then the next signal vector is transmitted. The completion of one transmission of all of $n_2$ signal vectors is referred to as one round, and a total of $r_2-2$ rounds are carried out. As for $n_2$ signal vectors transmitted per round, the terminal device UE2 receives them using the same antenna mode, and the terminal device UE2 uses $r_2-2$ antenna modes to respectively receive the $n_2$ signal vectors transmitted in the $r_2-2$ rounds.

Further, the base station eNB2 and the terminal device UE2 perform the following operations in the latter part (the $(r_2-2)n_2+1$-th time slot to the $r_1 n_1$-th time slot) of "Part 1": the base station eNB2 transmits all of $n_2$ signal vectors in packets, wherein the subscripts of the signal vectors in each packet have an interval of $r_1$. The respective signal vectors in each packet are weighted and combined and then transmitted. Weighting coefficients are randomly generated from a continuously distributed section to ensure that the reception equation for the terminal device UE2 is linearly independent. For packet transmission of the $n_2$ signal vectors, the weighting coefficients used in respective packets are different from each other. However, for additional $n_2$ signal vectors to be transmitted the next time, the same weighting coefficients as those used in the current transmission can be used. In addition, one round of transmission of all $n_2$ signal vectors can be completed from the $(r_2-2)n_2+1$-th time slot to the $(r_2-2)n_2+r_1$-th time slot. A total of rem $(M_2, N_2)$ rounds of packet transmission are performed. (The symbol rem(x, y) represents the remainder of x divided by y). For example, the signal vector transmitted in the $(r_2-2)n_2+1$-th time slot can be represented as $k_{1,1,1} v_1+k_{1,1,2} v_{r_1+1}+ \ldots +$ $k_{1,1,N_2} v_{n_2-r_1+1}, \ldots$, and the signal vector transmitted in the $(r_2-2)n_2+r_1$-th time slot can be represented as $k_{1,r_1,1} v_{r_1}+k_{1,r_1,2} v_{2r_1}+\ldots+k_{1,r_1,N_2} v_{n_2}$. The terminal device UE2 always uses the antenna mode $r_2-1$ to receive signals.

The operations in "Part 2" (the $r_1n_1+1$-th time slot to the $r_1n_1+n_2$-th time slot) are described below. The base station eNB1 and the terminal device UE1 perform the following operations in "Part 2": the base station eNB1 does not transmit, and the terminal device UE1 only receives an interference signal from the base station eNB2. As for each signal vector from the base station eNB2, the terminal device UE1 receives it using the same antenna mode as that used in the corresponding time slot during which the same signal vector is received in "Part 1", thereby obtaining an interference signal which experience the same channel characteristics as those experienced by the same signal vector received in "Part 1", so as to achieve accurate interference cancellation.

The base station eNB2 and the terminal device UE2 perform the following operations in "Part 2": the base station eNB2 sequentially transmits all of n2 signal vectors once. The terminal device UE2 receives for $r_1$ times using the antenna mode $r_2$, and then receives for $r_1$ times using the next antenna mode (i.e., mode $r_2+1$), . . . , until the terminal device UE2 receives for $r_1$ times using the antenna mode $r_2+N_2-1$.

As described above, all of the transmission time slots (the first time slot to the $r_1n_1+n_2$-th time slot) are divided into two periods of time. In the period of time "Part 1" (the first time slot to the $r_1n_1$-th time slot), both of the base stations eNB1 and eNB2 transmit signals, and thus the terminal device UE1 not only receives a signal from the serving base station eNB1, but also receives an interference signal from the base station eNB2. The interference signal is a downlink transmission signal from the base station eNB2 to the terminal device UE2 served by it. In the period of time "Part 2" (the $r_1n_1+1$-th time slot to the $r_1n_1+n_2$ time slot), the base station eNB1 stops transmitting signals while the base station eNB2 keeps transmitting, and thus the terminal device UE1 only receives the interference signal from the base station eNB2.

After completing the reception for all time slots, the terminal device UE1 can process the signal received in "Part 1" using the "pure" interference signal received in "Part 2". For example, the interference signal received in "Part 2" is cancelled (e.g., subtracted) from the signals received in "Part 1", so as to obtain the transmission signal from the base station eNB1 that does not include interference component. In this way, the terminal device UE1 located at the edge of the cell is able to eliminate the interference of the base station eNB2 when receiving signals. In particular, in each time slot in "Part 2", since the terminal device UE1 receives the signal transmitted by the base station eNB2 using the same antenna mode as that used in the corresponding time slot (i.e., the time slot during which the same signal is received) in "Part 1". Therefore, the interference signal obtained in "Part 2" experiences the same channel characteristics as those experienced by the interference signal included in the signal received in "Part 1", and thus it is closer to the interference signal included in the previous received signal. Accordingly, more accurate interference cancellation can be achieved.

For the terminal device UE2, it receives signals from the serving base station eNB2 using different antenna modes in "Part 1" and "Part 2", and thus the received signals experiencing different channel characteristics can be obtained, that is, a sufficient number of independent reception equations can be obtained to decode received signals.

FIG. 2 shows a schematic example in a two-cell asymmetric channel scenario, which may be considered to be a specific example of the above transmission and reception schemes. In this schematic example, the number of antennas M1 and M2 of the base stations eNB1 and eNB2 are respectively 3 and 7, and the number of antennas N1 and N2 of the terminal devices UE1 and UE2 are both 2. According to the above transmission scheme, it can be derived that the base station eNB1 transmits 5 independent 3×1 signal vectors (since the base station eNB1 has 3 transmission antennas, it is 3×1 signal vector), which is denoted as $u_i$ (i=1, 2, 3, 4, 5) and the base station eNB1 transmits twice. The base station eNB2 transmits 4 independent 7×1 signal vectors (since the base station eNB2 has 7 transmission antennas), which is denoted as v (1=1, 2, 3, 4) and the base station eNB2 transmits 4 times.

In FIG. 2, a total of 14 transmission time slots are divided into two period of times, in which, the period of time "Part 1" corresponds to the first time slot to the $r_1n_1$-th time slot in Table 1, and includes a total of 10 time slots; the period of time "Part 2" corresponds to the $r_1n_1+1$-th time slot to the $r_1n_1+n_2$-th time slot, and includes a total of 4 time slots.

For the base station eNB1, it only transmits signals in "Part 1". Based on the above number of transmission of the base station eNB1 $r_1=\lfloor M_1/N_1 \rfloor+1$, it can be derived that the base station eNB1 transmits each signal vector u, twice. This can also be understood as: the terminal device UE1 has two antennas, so that it can obtain two independent reception equations in each time slot, in order to enable the terminal device UE1 to solve each 3×1 signal vector $u_i$, the base station eNB1 needs to transmit each signal vector $u_i$ at least twice.

For the base station eNB2, it transmits signals in both "Part 1" and "Part 2". Based on the above number of transmission of the base station eNB2 $r_2=\lfloor M_2/N_2 \rfloor+1$, it can be derived that the base station eNB2 transmits each signal vector $v_i$ 4 times. Specifically, in the first 8 time slots (corresponding to the first time slot to the $(r_2-2)n_2$-th time slot) of "Part 1", each signal vector $v_i$ is independently transmitted twice, and in the last 2 time slots (corresponding to the $(r_2-2)n_2+1$-th time slot to the $r_1n_1$-th time slot) of "Part 1", the signal vector $v_i$ (i=1, 2, 3, 4) is transmitted in packets. For example, as shown in FIG. 2, as the first packet, the vectors $v_1$ and $v_3$ are weighted and combined and then transmitted in the time slot 9, and as the second packet, the vectors $v_2$ and $v_4$ are weighted and combined and then transmitted in the time slot 10. The weighting coefficients $k_i$ (i=1, 2, 3, 4) can be randomly selected from one continuous section, such as (−10, 10). Finally, in "Part 2", each signal vector is transmitted once. The purpose for the base station eNB2 to transmit 4 signal vectors once in "Part 2" is to enable the terminal device UE1 to obtain a "pure" interference signal. At the same time, the terminal device UE2 can recover 4 signal vectors transmitted by the base station eNB2 by receiving in "Part 1" and "Part 2".

It should be noted that, the purpose for packet transmission in the last 2 time slots of "Part 1" is to maximally use time resources. If packet transmission is not performed, the base station eNB2 transmits each signal vector $v_i$ (i=1, 2, 3, 4) 4 times, then it takes 4×4=16 time slots to transmit. However, in the case of using packet transmission, the base station eNB2 occupies a total of 14 time slots to transmit signals in "Part 1" and "Part 2". Since the number of antennas $N_2$ of the terminal device UE2 is 2, which can obtain two independent reception equations in each time slot, the terminal device UE2 obtains a total of 28 independent reception equations in 14 time slots. These 28 reception equations are sufficient to solve four 7×1 signal vectors transmitted by the base station eNB2. It can be seen that the scheme using packet transmission can reduce the occupation of two time slots, and thus time resources can be saved.

For the terminal device UE1, since the base station eNB1 and the base station eNB2 both transmit signals in "Part 1", the terminal device UE1 not only receives a signal from the serving base station eNB1, but also receives a signal from the base station eNB2. However, in "Part 2", since the base station eNB1 stops the downlink transmission to the terminal device UE1, the terminal device UE1 only receives the interference from the base station eNB2. Subsequently, the terminal device UE1 can cancel (e.g., subtract) the interference signal received in "Part 2" from the signal received in "Part 1", so that a useful signal from the base station eNB1 that does not include an interference component can be obtained. In this way, interference of the base station eNB2 to the terminal device UE1 can be eliminated.

Furthermore, as shown in FIG. 2, the antenna mode used by the terminal device UE1 for receiving a signal vector in each time slot of "Part 2" is the same as the antenna mode used in a corresponding slot for receiving the same signal vector in "Part 1". This is to obtain an interference signal under condition of the same channel characteristics, so as to make the interference signal is maximally approximated to the interference signal included in the previously received signal, so that the interference can be cancelled more accurately. In contrast, the antenna mode in which the terminal device UE2 receives a signal in "Part 2" is different from the antenna mode used in "Part 1". That is, the terminal device UE2 receives a signal from its serving base station eNB2 under different channel characteristics in "Part 2" in order to obtain additional independent reception equations to solve the transmitted signal vector $v_i$.

In the example shown in FIG. 2, for example, the signals received by the terminal device UE1 in the 1-st, 2-nd, 11-th, 12-th time slots can be represented as:

$$y_1(1) = H_{11}(1)u_1 + H_{12}(1)v_1 + z_1(1)$$

$$y_1(2) = H_{11}(2)u_1 + H_{12}(2)v_2 + z_1(2)$$

$$y_1(11) = H_{12}(1)v_1 + z_1(11)$$

$$y_1(12) = H_{12}(2)v_2 + z_1(12) \quad (3)$$

where $H_{ij}(m)$ indicates a channel matrix from the j-th (j=1, 2) base station to the i-th (i=1, 2) terminal device in an antenna mode m (m=1, 2), $z_i(t)$ (i=1, 2) is complex Gaussian noise vector.

After the terminal device UE1 cancels the interference signal, it obtains:

$$\begin{pmatrix} y_1(1) - y_1(11) \\ y_1(2) - y_1(12) \end{pmatrix} = \begin{pmatrix} H_{11}(1) \\ H_{11}(2) \end{pmatrix} u_1 + \begin{pmatrix} z_1(1) - z_1(11) \\ z_1(2) - z_1(12) \end{pmatrix} \quad (4)$$

Based on the equation (4), the signal vector $u_1$ can be recovered by simple linear decoding. In a similar manner, the terminal device UE1 can recover the signal vectors $u_2$, $u_3$, $u_4$ transmitted by the base station eNB1. As for the signal vector $u_5$, the terminal device UE1 can solve it through the following equation:

$$\begin{pmatrix} y_1(9) - k_1 y_1(11) - k_2 y_1(13) \\ y_1(10) - k_3 y_1(12) - k_4 y_1(14) \end{pmatrix} = \quad (5)$$

-continued
$$\begin{pmatrix} H_{11}(1) \\ H_{11}(2) \end{pmatrix} u_5 + \begin{pmatrix} z_1(1) - k_1 z_1(11) - k_2 z_1(13) \\ z_1(2) - k_3 z_1(12) - k_4 z_1(14) \end{pmatrix}$$

For the terminal device UE2, the signal vectors $v_1$, $v_3$ transmitted by the base station eNB2 can be recovered by the following equation (6):

$$\begin{pmatrix} y_2(1) \\ y_2(3) \\ y_2(5) \\ y_2(7) \\ y_2(9) \\ y_2(11) \\ y_2(13) \end{pmatrix} = \begin{pmatrix} H_{22}(1) & O \\ O & H_{22}(1) \\ H_{22}(2) & O \\ O & H_{22}(2) \\ k_1 H_{22}(3) & k_2 H_{22}(3) \\ H_{22}(4) & O \\ O & H_{22}(5) \end{pmatrix} \begin{pmatrix} v_1 \\ v_3 \end{pmatrix} + \begin{pmatrix} z_2(1) \\ z_2(3) \\ z_2(5) \\ z_2(7) \\ z_2(9) \\ z_2(11) \\ z_2(13) \end{pmatrix} \quad (6)$$

where O is a 2×7 zero matrix. In a similar manner, the terminal device UE2 can solve the signal vectors $v_2$, $v_4$.

Hereinafter, the performance of the present disclosure and the conventional technology will be compared from the perspective of degree of freedom, which refers to the number of independent data streams that can be transmitted.

In the two-cell asymmetric channel scenario, the degree of freedom that can be achieved according to the solution of the present disclosure is $$DoF = \frac{n_1 M_1 + n_2 M_2}{n_1 r_1 + n_2}.$$

In the conventional interference control technology, such as in the case of a Time Division Multiplexing (TDMA) system, the maximum degree of freedom is max[min($M_1$, $N_1$), min($M_2$, $N_2$)], and the average degree of freedom is [min($M_1$, $N_1$)+min($M_2$, $N_2$)]/2.

Taking the example shown in FIG. 2 as an example, a total of five 3×1 signal vectors and four 7×1 signal vectors are transmitted in 14 time slots, that is, 5×3+4×7=43 independent symbols are transmitted. Therefore, the degree of freedom of the system can be calculated as 43/14≈3.07 wherein the degree of freedom of the terminal device UE1 is 5×3/14≈1.07, and the degree of freedom of the terminal device UE2 is 4×7/14=2 However, the maximum degree of freedom for the TDMA system is max[min(3,2), min(7,2)]=2, and the average degree of freedom is [min(3, 2)+min(7,2)]/2=2. It can be seen that, according to the solution of the present disclosure, the terminal device UE2 can obtain the same degree of freedom as the conventional TDMA system while the terminal device UE1 acquires additional degree of freedom. This enables the system using the solution of the present disclosure to obtain a throughput larger than the TDMA system.

The transmission scheme of the base stations eNB1, eNB2, eNB3 and the corresponding reception scheme of the terminal devices UE1, UE2, UE3 in the three-cell asymmetric channel scenario according to the solution of the present invention will be described below. It is assumed that the terminal device UE1 is interfered by the neighboring base stations eNB2 and eNB3, and the terminal devices UE2 and UE3 are not interfered by the base station eNB1. In the present scheme, the base station eNB1 transmits $n_1=(M_2-N_2)(M_3-N_3)$ signal vectors, and each signal vector is repeatedly transmitted $r_1=\lfloor M_1/N_1 \rfloor+1$ times. The base station eNB2 transmits $n_2=r_1N_2(M_3-N_3)$ signal vectors, and each signal vector is repeatedly transmitted $r_2=\lfloor M_2/N_2 \rfloor+1$ times. The base station eNB3 transmits $n_3$ $r_1N_3(M_2-N_2)$ signal vectors, and each signal vector is repeatedly transmitted $r_3=\lfloor M_3/N_3 \rfloor+1$ times. Further, in the present scheme, the overall transmission period is divided into three parts, the first part ("Part 1") includes a period of time from the first time slot to the $r_1n_1$-th time slot, the second part ("Part 2") includes a period of time from the $r_1n_1+1$-th time slot to the $r_1n_1+n_2$-th time slot, and the third part ("Part 3") includes a period of time from the $r_1n_1+n_2+1$-th time slot to the $r_1n_1+n_2+n_3$-th time slot.

First, the operation of each base station and terminal device in "Part 1" (the first time slot to the $r_1n_1$-th time slot) will be described. The base station eNB1 and the terminal device UE1 perform the following operations in "Part 1": the base station eNB1 transmits all of $n_1$ signal vectors, each signal vector is repeatedly transmitted $r_1$ times and then the next signal vector is transmitted. For one signal vector from the base station eNB1, the terminal device UE1 receives it by sequentially using antenna modes 1 to $r_1$, and then receives the next signal vector using antenna modes 1 to $r_1$.

For the base station eNB2 and the terminal device UE2, they perform the following operations in the former part (the first time slot to the $(r_2-2)$m-th time slot) of "Part 1": the base station eNB2 transmits all of $n_2$ signal vectors, each signal vector is transmitted once and then the next signal vector is transmitted. The completion of one transmission of all $n_2$ signal vectors is referred to as one round. A total of $r_2-2$ rounds are carried out. For $n_2$ signal vectors transmitted per round, the terminal device UE2 receives them using the same antenna mode. The terminal device UE2 uses $r_2-2$ antenna modes (i.e., antenna modes 1 to $r_2-2$) to respectively receive signal vectors transmitted in the $r_2-2$ rounds.

Further, the base station eNB2 and the terminal device UE2 perform the following operations in the latter part (the $(r_2-2)n_2+1$-th time slot to the $r_1n_1$-th time slot) of "Part 1": the base station eNB2 transmits all of n2 signal vectors in packets, wherein the subscripts of the signal vectors in each packet have an interval of $r_1$. The respective signal vectors in each packet are weighted and combined and then transmitted. Weighting coefficients are randomly generated from a continuously distributed section. For packet transmission of the $n_2$ signal vectors, the weighting coefficients used in respective packets are different from each other. However, for additional $n_2$ signal vectors to be transmitted the next time, the same weighting coefficients as those used in the current transmission can be used. In addition, one round of transmission of all $n_2$ signal vectors can be completed from the $(r_2-2)n_2+1$-th time slot to the $(r_2-2)n_2+r_1$-th time slot. A total of rem $(M_2, N_2)$ rounds of packet transmission are performed. For example, the signal vector transmitted in the $(r_2-2)n_2+1$-th time slot can be represented as $p_{1,1,1} v_1 + p_{1,1,2} v_{r_1+1} + \ldots + p_{1,1,n_2/r_1} v_{n_2-r_1+1}, \ldots$, and the signal vector transmitted in the $(r_2-2)n_2+r_1$-th time slot can be represented as $p_{1,r_1,1} v_{r_1} + p_{1,r_1,2} v_{2r_1} + \ldots + p_{1,r_1,n_2/r_1} v_{n_2}$. The terminal device UE2 always uses the antenna mode $r_2-1$ to receive.

For the base station eNB3 and the terminal device UE3, they perform the following operations in the former part (the first time slot to the $(r_3-2)n_3$-th time slot) of "Part 1": the base station eNB3 transmits all of $n_3$ signals, each signal vector is transmitted once and then the next signal vector is transmitted. The completion of one transmission of all $n_3$ signal vectors is referred to as one round. A total of $r_3-2$ rounds are carried out. For $n_3$ signal vectors transmitted per round, the terminal device UE3 receives it using the same antenna mode. The terminal device UE3 uses $r_3-2$ antenna modes (i.e., antenna modes 1 to $r_3-2$) to respectively receive signal vectors transmitted in the $r_3-2$ rounds.

Further, the base station eNB3 and the terminal device UE3 perform the following operations in the latter part (the $(r_3-2)n_3+1$-th time slot to the $r_1n_1$-th time slot) of "Part 1": the base station eNB3 transmits all of $n_3$ signal vectors in packets, wherein the subscripts of the signal vectors in each packet have an interval of $r_1$. The respective signal vectors in each packet are weighted and combined and then transmitted. Weighting coefficients are randomly generated from a continuously distributed section. For packet transmission of the $n_3$ signal vectors, the weighting coefficients used in respective packets are different from each other. However, for additional $n_3$ signal vectors to be transmitted the next time, the same weighting coefficients as those used in the current transmission can be used. In addition, one round of transmission of all $n_3$ signal vectors can be completed from the $(r_3-2)n_3+1$-th time slot to the $(r_3-2)n_3+r_1$-th time slot. A total of rem $(M_3, N_3)$ rounds of packet transmission are performed. For example, the signal vector transmitted in the $(r_3-2)n_3+1$-th time slot can be represented as $k_{1,1,1} w_1 + k_{1,1,2} w_{r_1+1} + \ldots + k_{1,1,n_3/r_1} w_{n_3-r_1+1}, \ldots$, and the signal vector transmitted in the $(r_3-2)n_3+r_1$-th time slot can be represented as $k_{1,r_1,1} w_{r_1} + k_{1,r_1,2} w_{2r_1} + \ldots + k_{1,r_1,n_3/r_1} w_{n_3}$. The terminal device UE3 always uses the antenna mode $r_3-1$ to receive.

Next, the operations in "Part 2" (the $r_1n_1+1$-th time slot to the $r_1n_1+n_2$-th time slot) will be described. The base station eNB1 and the terminal device UE1 perform the following operations in "Part 2": the base station eNB1 does not transmit, and the terminal device UE1 only receives an interference signal from the base station eNB2. For each signal vector from the base station eNB2, the terminal device UE1 receives it using the same antenna mode as that used in the corresponding time slot during which the same signal vector is received in "Part 1", thereby obtaining the interference signal which experiences the same channel characteristics.

The base station eNB2 and the terminal device UE2 perform the following operations in "Part 2": the base station eNB2 sequentially transmits all of $n_2$ signal vectors once. The terminal device UE2 receives for $r_1$ times using the antenna mode $r_2$, and then receives for $r_1$ times using the next antenna mode (i.e., mode $r_2+1$), . . . , until the terminal device UE2 receives for $r_1$ times using the antenna mode $r_2+N_2-1$, which is referred to as one round of reception. The terminal device UE2 performs a total of $M_3-N_3$ rounds of receptions.

The base station eNB3 and the terminal device UE3 perform the following operations in "Part 2": the base station eNB3 does not transmit, and the terminal device UE1 does not receive.

Next, the operations in "Part 3" (the $r_1n_1+n_2+1$-th time slot to the $r_1n_1+n_2+n_3$-th time slot) will be described. The base station eNB1 and the terminal device UE1 perform the following operations in "Part 3": the base station eNB1 does not transmit, and the terminal device UE1 only receives an interference signal from the base station eNB3. For each signal vector from the base station eNB3, the terminal device UE1 receives it using the same antenna mode as that used in the corresponding time slot during which the same signal vector is received in "Part 1", thereby obtaining the interference signal which experiences the same channel characteristics.

The base station eNB2 and the terminal device UE2 perform the following operations in "Part 3": the base station eNB2 does not transmit, and the terminal device UE2 does not receive.

The base station eNB3 and the terminal device UE3 perform the following operations in "Part 3": the base station eNB3 sequentially transmits all of $n_3$ signal vectors once. The terminal device UE3 receives for $r_1$ times using the antenna mode $r_3$, and then receives for $r_1$ times using the next antenna mode (i.e., mode $r_3+1$), . . . , until the terminal device UE3 receives for $r_1$ times using the antenna mode $r_3+N_3-1$, which is referred to as one round of reception. The terminal device UE3 performs a total of $M_2 \cdot N_2$ rounds of receptions.

As described above, all of the transmission time slots (the first time slot to the $r_1n_1+n_2+n_3$-th time slot) are divided into three periods of times. In the period of time "Part 1" (the first time slot to the $r_1n_1$-th time slot), all of the base stations eNB1, eNB2 and eNB3 transmit signals, and thus the terminal device UE1 not only receives a signal from the serving base station eNB1, but also receives interference signals from the base stations eNB2 and eNB3. In the period of time "Part 2" (the $r_1n_1+1$-th time slot to the $r_1n_1+n_2$ time slot), the base stations eNB1 and eNB3 do not transmit signals while the base station eNB2 keeps transmitting, and thus the terminal device UE1 only receives an interference signal from the base station eNB2. In the period of time "Part 3" (the $r_1n_1+n_2+1$ time slot to the $r_1n_1+n_2+n_3$-th time slot), the base stations eNB1 and eNB2 do not transmit signals while the base station eNB3 transmits signals, and thus the terminal device UE1 only receives an interference signal from the base station eNB3.

After completing the reception for all time slots, the terminal device UE1 can process the signals received in "Part 1" using the interference signals received from the base stations eNB2 and eNB3 in "Part 2" and "Part 3". For example, the interference signals received in "Part 2" and "Part 3" are cancelled (e.g., subtracted) from the signal received in "Part 1", so that the useful signal from the base station eNB1 that does not include an interference component can be obtained. In this way, the terminal device UE1 located at the edge of the cell is able to eliminate the interference of the base stations eNB2 and eNB3 when receiving signals. In particular, as shown in Table 2, in each time slot in "Part 2" and "Part 3", since the terminal device UE1 receives signals by using the antenna mode which was used in the corresponding time slot (i.e., the time slot during which the same signal vector is received) in "Part 1", the interference signals obtained in "Part 2" and "Part 3" experiences the same channel characteristics as those experienced by the interference signals included in the previously received signals. Therefore, more accurate interference cancellation can be achieved.

On the other hand, for the terminal device UE2, it receives signals from the serving base station eNB2 by using different antenna modes in "Part 1" and "Part 2", and thus the received signals experiencing different channel characteristics can be obtained. That is, a sufficient number of independent reception equations can be obtained to decode the received signals. Similarly, for the terminal device UE3, it receives signals from the serving base station eNB3 by using different antenna modes in "Part 1" and "Part 3", and thus a sufficient number of independent reception equations can be obtained to decode the received signals.

FIG. 3 shows a schematic example in a three-cell asymmetric channel scenario, which may be considered to be a specific example of the above transmission and reception schemes. In this schematic example, the numbers of antennas M1, M2 and M3 of the base stations eNB1, eNB2 and eNB3 are respectively 7, 5 and 8, and the number of antennas Ni, N2 and N3 of the terminal devices UE1, UE2 and UE3 are respectively 4, 2 and 3.

According to the above transmission scheme, it can be derived that the base station eNB1 transmits 15 independent 7×1 signal vectors (since the base station eNB1 has 7 transmission antennas), which is denoted as $u_i$ (i=1, 2, . . . , 15), and the base station eNB1 transmits twice. The base station eNB2 transmits 20 independent 5×1 signal vectors (since the base station eNB2 has 5 transmission antennas), which is denoted as $v_i$ (i=1, 2, . . . , 20), and the base station eNB2 transmits 3 times. The base station eNB3 transmits 18 independent 8×1 signal vectors (since the base station eNB3 has 8 transmission antennas), which is denoted as $w_i$ (i= 1, 2, . . . , 18), and the base station eNB3 transmits 3 times.

In FIG. 3, a total of 68 transmission time slots are divided into three periods of time. The period of time "Part 1" corresponds to the first time slot to the $r_1n_1$-th time slot, and includes a total of 30 time slots. "Part 2" corresponds to the $r_1n_1+1$-th time slot to the $r_1n_1+n_2$-th time slot, and includes a total of 20 time slots. "Part 3" corresponds to the $r_1n_1+n_2+1$-th time slot to the $r_1n_1+n_2+n_3$-th time slot, and includes a total of 18 time slots.

For the base station eNB1, it only transmits signals in "Part 1". Since the terminal device UE1 has four antennas, it may obtain four independent reception equations in each time slot. In order for the terminal device UE1 to solve each 7×1 signal vector $u_i$, the base station eNB1 needs to transmit each signal vector at least twice.

For the base station eNB2, it transmits signals in both "Part 1" and "Part 2", and stops transmitting in "Part 3". Specifically, in the first 20 time slots (corresponding to the first time slot to the $(r_2-2)n_2$-th time slot in Table 2) of "Part 1", the base station eNB2 independently transmits each signal vector $v_i$ once. In the last 10 time slots (corresponding to the $(r_2-2)n_2+1$-th time slot to the $r_1n_1$-th time slot) of "Part 1", the base station eNB2 transmits the signal vector $v_i$ (i=1, 2, . . . , 20) in packets. The signal vectors in each packet are weighted and combined and then transmitted in the corresponding time slot. The weighting coefficients $p_i$ (i=1, 2, . . . , 20) can be randomly selected from a continuous section. As described above, the purpose for packet transmission is to reduce the time slots occupied by transmission, thereby improving the utilization of time resources. Then in "Part 2", the base station eNB2 sequentially transmits each signal vector once, in order for the terminal device UE1 to obtain a "pure" interference signal, and also for the terminal device UE2 to obtain sufficient reception equations to decode signals.

The transmission manner of the base station eNB3 is similar to that of the base station eNB2. The base station eNB3 transmits signals in both "Part 1" and "Part 3", and stops transmitting in "Part 2". In the first 18 time slots (corresponding to the first time slot to the $(r_3-2)n_3$-th time slot in Table 2) of "Part 1", the base station eNB3 independently transmits each signal vector $w_i$ once. In the last 12 time slots (corresponding to the $(r_3-2)n_3+1$-th time slot to the $r_1n_1$-th time slot) of "Part 1", the base station eNB3 transmits the signal vector $w_i$ (i=1, 2, . . . , 18) in packets. The weighting coefficients $k_i$ (i=1, 2, . . . , 36) can be randomly selected from a continuous section. Then in "Part 3", the base station eNB3 sequentially transmits each signal vector once.

As described above, the terminal device UE1 may cancel (e.g., subtract) the interference signals received from the base stations eNB2 and eNB3 in "Part 2" and "Part 3" from the signal received in "Part 1", so that the useful signal from the serving base station eNB1 that does not include an interference component can be obtained. In this way, the interference of the base stations eNB2 and eNB3 to the terminal device UE1 located at the edge of the cell can be eliminated.

Furthermore, as shown in FIG. 3, the terminal device UE1 receives signals by using the same antenna mode as that used in the corresponding time slot of "Part 1" in the respective time slots of "Part 2" and "Part 3", so that the interference signals which experience the same channel condition can be obtained to achieve more accurate cancellation of interference.

In contrast, the antenna modes used by the terminal devices UE2 and UE3 to receive signals in "Part 2" and "Part 3" are different from the antenna mode used in "Part 1". Therefore, the terminal devices UE2 and UE3 are able to obtain additional independent reception equations in "Part 2" and "Part 3" respectively, to solve the signal vector $v_i$ or $w_i$ transmitted from their serving base stations.

In the scenario of the three-cell asymmetric channel, the degree of freedom that can be achieved according to the solution of the present disclosure is $$DoF = \frac{n_1 M_1 + n_2 M_2 + n_3 M_3}{n_1 r_1 + n_2 + n_3}.$$

In the case of the conventional Time Division Multiplexing (TDMA) system, the average degree of freedom is $\{\min(M_1,N_1)+[\min(M_2,N_2)+\min(M_3,N_3)]\}/2$.

For example, in the example shown in FIG. 3, the degree of freedom of the BIA method according to the present disclosure is $(15\times7+20\times5+18\times8)/68\approx5.13$ while in the TDMA system the average degree of freedom is $\{\min(7,4)+[\min(5,2)+\min(8,3)]\}/2=4.5$. As can be seen, the solution of the present disclosure can achieve a greater degree of freedom, which means a greater system throughput.

In the above embodiment, without loss of generality, it is assumed that the number of antennas Mi of each base station is not an integral multiple of the number of antennas Ni of the corresponding terminal device. However, when the number of antennas Mi of the base station is an integral multiple of the number of antennas Ni of the terminal device served by it, the above formula for determining the number of times for which each base station transmits signals needs to be modified. For example, in the two-cell asymmetric channel scenario, the base station eNB1 transmits $n_1$ signal vectors, and each signal vector needs to be repeatedly transmitted for $r_1=M_1/N_1$ times, instead of $r_1=\lfloor M_1/N_1 \rfloor+1$ times as described above. Also, the base station eNB2 repeatedly transmits each signal vector for $r_2=M_2/N_2$ times. Similarly, in the three-cell asymmetric channel scenario, the number of times for which the base stations eNB1, eNB2, and eNB3 transmit each signal vector is modified as $r_1=M_1/N_1$, $r_2=M_2/N_2$, and $r_3=M_3/N_3$, respectively. In the case where the parameter $r_i$ is modified, the number $n_i$ of signal vectors to be transmitted by each base station accordingly needs to be calculated using the modified parameter $r_i$. In addition, in the case where the number of antennas Mi of the base station is an integral multiple of the number of antennas Ni of the corresponding terminal device, the pattern reconfigurable antennas of the respective terminal devices UE1, UE2 and UE3 need to support the following numbers of antenna modes:

$$M_1/N_1, \frac{M_2}{N_2}+N_2-2, \frac{M_3}{N_3}+N_3-2,$$

respectively.

The embodiments of the present disclosure are described above by taking the two-cell asymmetric channel and the three-cell asymmetric channel as examples. Those skilled in the art may also extend the present disclosure to scenarios such as a four-cell asymmetric channel (for example, the terminal device UE1 is located at the boundary of four cells and is subjected to interferences from three neighboring base stations) in the same manner according to actual requirements. However, it should be noted that when applied to a scenario containing more neighboring cells, the periods of time during which each base station needs to stop transmission will become more. For example, in the case of the four-cell asymmetric channel, the base station eNB2 needs to stop transmission in two periods of time, so that the terminal device UE1 may receive only signals from the base stations eNB3 and eNB4 in said two periods of time. Similarly, the base station eNB1 needs to stop transmission in three periods of time. That is, in order for the terminal device UE1 to perform interference cancellation, the normal communication between the neighboring base station and the terminal served by it would be greatly affected, and the communication efficiency between the terminal device UE1 and the serving base station eNB1 would also decrease, and thereby leading to a low overall efficiency of the system. Therefore, in practical applications, those skilled in the art need to make a compromise between the interference cancellation and the overall system efficiency. The present disclosure is preferably applied to scenarios of the two-cell asymmetric channel and the three-cell asymmetric channel.

Figure 4:
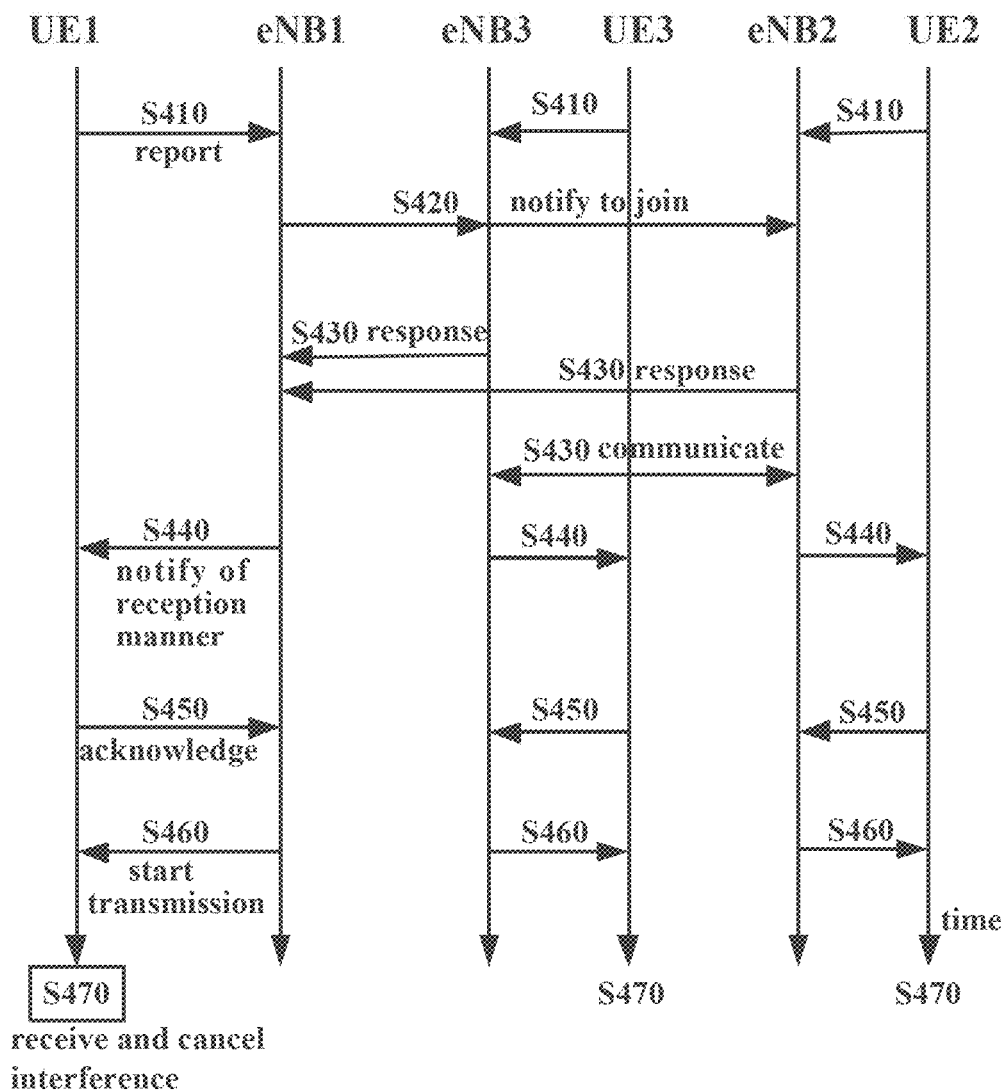
FIG. 4 shows signaling interaction flow between a base station and a terminal device.

FIG. 4 is a diagram showing a signaling interaction between respective base stations and respective terminal devices. As shown in FIG. 4, in step S410, the terminal devices UE1, UE2 and UE3 report their own location information, the numbers of antennas, and the numbers of supported antenna modes to their serving base stations eNB1, eNB2 and eNB3, respectively. It should be noted that, although FIG. 4 only shows the reporting of the terminal devices UE1, UE2 and UE3, those skilled in the art can easily understand that, taking the base station eNB1 as an example, a plurality of other terminal devices (in addition to the terminal device UE1) served by it also reports their own position information, the numbers of antennas, and the numbers of antenna modes to the base station eNB1. The same applies to the base stations eNB2 and eNB3.

Each base station determines, according to the received location information of the terminal device, whether the terminal device is located inside the cell or at a boundary with a neighboring cell. That is, the base station determines whether the terminal device may be interfered by the neighboring base stations. Hereinafter, it is assumed that the base station eNB1 determines that the terminal device UE1 is located within its cell and adjacent to the coverage of the base stations eNB2 and eNB3, and thus determines that the terminal device UE1 is interfered by the neighboring base stations eNB2 and eNB3. Subsequently, in step S420, the base station eNB1 transmits a signal to the base stations eNB2 and eNB3 to notify them to join the BIA process, and notifies the base station eNB2 and eNB3 of the number of antennas of the base station eNB1 and information about the terminal device UE1 (e.g., location information, number of antennas, frequency, etc.). It should be noted that, if the terminal device UE1 is located within the cell and adjacent to the coverage of the base stations eNB2 and thus only receives interference from the base station eNB2 (two-cell asymmetric channel scenario), then in step S420, the base station eNB1 only notifies the base station eNB2 to join the BIA process and transmits the relevant information to the base station eNB2 without transmitting a notification signal to the base station eNB3.

Subsequently, the base stations eNB2 and eNB3 respectively select terminal devices in their own coverage that occupy the same time-frequency resource as the terminal device UE1 and are not interfered by the base station eNB1 (away from the coverage of the base station eNB1). It is assumed that the selected terminal devices are terminal devices UE2 and UE3 respectively. In step S430, the base stations eNB2 and eNB3 transmit, to the base station eNB1, a response signal for confirming the joining of the BIA process, the numbers of their own antennas and information about the terminal devices UE2 and UE3 (for example, the number of antennas). In addition, in step S430, the base stations eNB2 and eNB3 communicate the number of antennas of the base station and the number of antennas of the terminal device UE2 or UE3 to each other.

As described above, in step S420, the base station eNB1 notifies the base stations eNB2 and the eNB3 to join the BIA process, and at the same time, transmits information related to the base station eNB1 and the terminal device UE1. Then, in step S430, the base stations eNB2 and eNB3 respectively transmit response signals to the base station eNB1, and at the same time, transmit information related to the base stations eNB2 and eNB3 and the terminal devices UE2 and UE3. Alternatively, as another example, in step S420, the base station eNB1 may only transmit a request signal for notifying the base stations eNB2 and eNB3 to join the BIA process. After receiving the response signals for confirming participation in the BIA process from the base stations eNB2 and eNB3, the base station eNB1 and the base stations eNB2 and eNB3 may communicate their information and related information of the terminal devices served by them.

So far, all of the base stations eNB1, eNB2, and eNB3 participating in the BIA process have had information such as the number of antennas of each base station and each terminal device, and thus respective downlink transmission manners can be determined according to the transmission scheme described above. The transmission manners may include, for example, at least some of the following: in which period of time (which time slot) the signal is or is not transmitted, what signal vector is transmitted in each time slot, the weighting coefficients for packet transmission, and the number of times for the repeated transmission.

In addition, the base stations eNB1, eNB2 and eNB3 also determine the reception manners of the terminal devices UE1, UE2 and UE3, and generate indication information for indicating the reception manners. The indication information may indicate, for example, at least some of the following: information on the periods of time (such as the above "Part 1", "Part 2", etc.), the antenna mode for receiving signal in each time slot, and the weighting coefficients required for decoding the signal vector transmitted in packets. Then, in step S440, the base stations eNB1, eNB2 and eNB3 respectively transmit indication information for indicating the reception manners to the corresponding terminal devices UE1, UE2 and UE3, so that the terminal devices receive signals and perform interference cancellation processing according to the reception manners indicated by the indication information. It should be noted that, as shown in FIG. 3 and FIG. 4, since the base station eNB1 does not perform packet transmission, it is not necessary to notify the terminal device UE1 of the weighting coefficients.

The terminal devices UE1, UE2 and UE3 determine the reception manners to be used according to the received indication information, and then, in step S450, respectively transmit acknowledgment signals to their serving base stations to indicate that they are ready.

Then, in step S460, the base stations eNB1, eNB2 and eNB3 start downlink transmission in accordance to the determined transmission manners.

The terminal devices UE1, UE2 and UE3 set the antenna modes to receive signals and decode the signals according to the reception manners notified by the base stations eNB1, eNB2 and eNB3 in step S440, and perform the processing of interference cancellation based on the notified period of time, as shown in Step S470.

Figure 5:
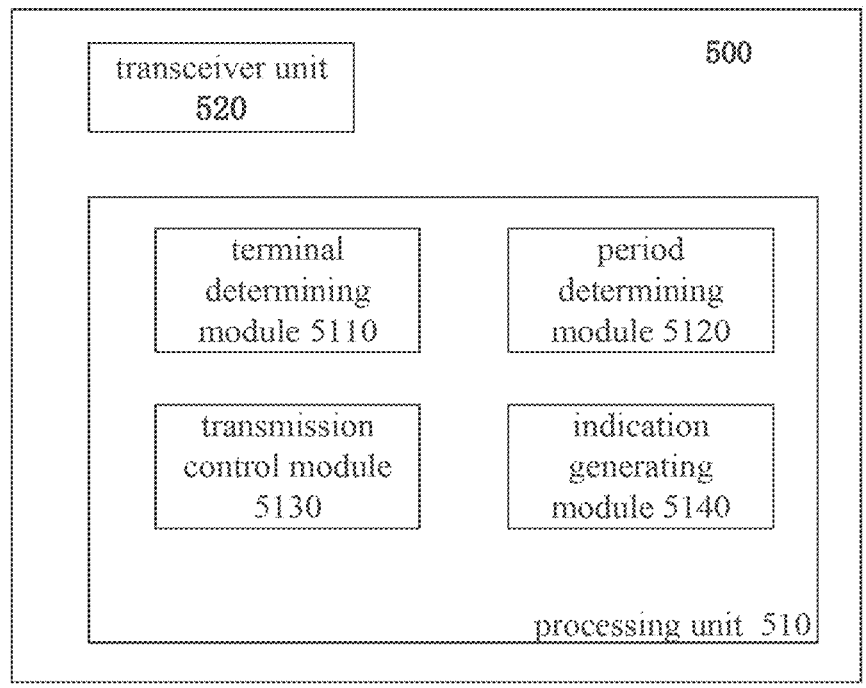
FIG. 5 shows a functional block diagram of a base station in accordance with the present disclosure.

FIG. 5 shows a functional block diagram of a base station according to the present disclosure. As shown in FIG. 5, the base station 500 includes a processing unit 510 and a transceiver unit 520. The transceiver unit 520 may be implemented as an antenna for receiving and transmitting signal. The processing unit 510 includes a terminal determining module 5110, a period determining module 5120, a transmission control module 5130, and an indication generating module 5140.

The terminal determining module 5110 of the base station 500 is used for determining, according to the location information reported by each terminal device, a terminal device which is located at the edge of the cell (for example, the terminal device UE1 is determined by the base station eNB1), or determining, within its own cell, a terminal device which occupies the same communication resource with other terminal devices and is not interfered by other base stations (for example, the terminal devices UE2 and UE3 are determined by the base stations eNB2 and eNB3). After determining the terminal device, the terminal determining module 5110 further acquires information on the number of antennas of the corresponding terminal device.

The period determining module 5120 determines the periods of time during which the downlink transmission is performed by using the information on the number of antennas of respective base stations and respective terminal devices which participate in the BIA process obtained through communication (for example, according to the transmission scheme described above). For example, the base station eNB1 determines the period of time "Part 1" for transmitting signal and the period of time "Part 2" for stopping signal transmission.

The transmission control module 5130 controls the downlink transmission based on the period of time determined by the period determining module 5120. For example, for the period of time during which transmission is required, the transmission control module 5130 may determine signal vectors to be transmitted in each time slot, the transmission manner (e.g., whether to perform packet transmission), the number of times of transmission, and the like.

The indication generating module 5140 determines the reception manner to be used by the terminal device, and generates indication information for indicating the reception manner and to be transmitted to the terminal device.

It should be noted that, although the above functional modules of the base station 500 are illustrated in FIG. 5, the present disclosure is not limited thereto. The base station 500 may include more or fewer modules than those shown in FIG. 5, depending on the actual applications and design requirements.

Figure 6:
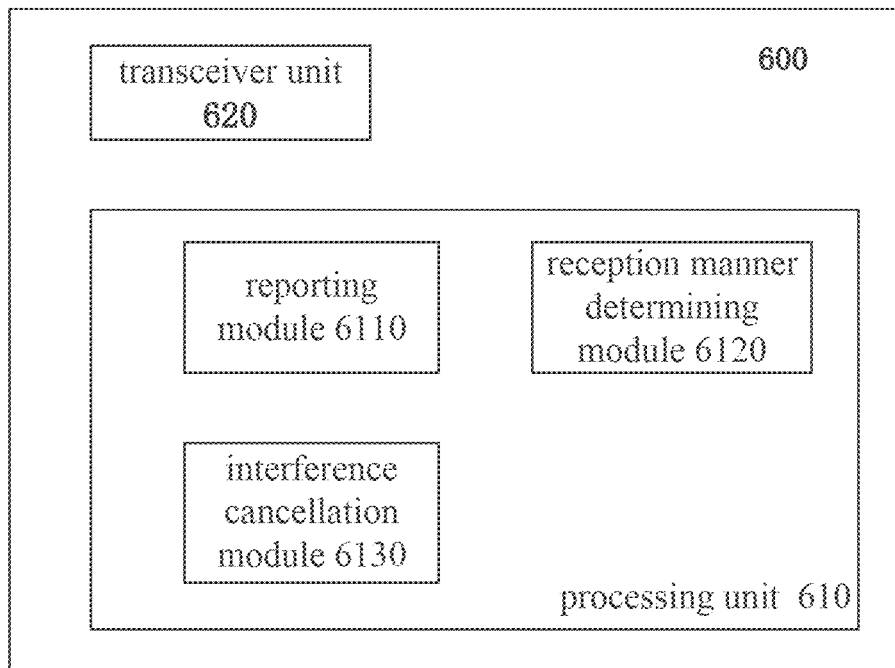
FIG. 6 is shows a functional block diagram of a terminal device in accordance with the present disclosure.

FIG. 6 shows a functional block diagram of a terminal device according to the present disclosure. As shown in FIG. 6, the terminal device 600 includes a processing unit 610 and a transceiver unit 620. The transceiver unit 620 can be implemented as a pattern reconfigurable antenna having a plurality of operation modes. When the pattern reconfigurable antenna operates in different modes, transmission channels experienced by the received signals can be considered to be independently and identically distributed. The processing unit 610 includes a reporting module 6110, a reception manner determining module 6120, and an interference cancellation module 6130.

The reporting module 6110 is used for reporting to the base station information such as the location, the number of antennas, and the number of supported antenna modes of the terminal device 600.

The reception manner determining module 6120 determines a reception manner for receiving signal according to the indication information transmitted by the base station. For example, the reception manner determining module 6120 can determine the antenna mode used in each time slot according to the indication information, and determine weighting coefficients for decoding the signal vectors transmitted in packets. In addition, the reception manner determining module 6120 may determine in which period of time the mixed signal of the useful signal and the interference signal is received, and in which period of time the "pure" interference signal is received according to the indication information, and notify the interference cancellation module 6130 of the determined periods of time.

The interference cancellation module 6130 performs interference cancellation process based on the periods of time determined by the reception manner determination module 6120. For example, as described above, the interference signals received in "Part 2" and "Part 3" are cancelled (e.g., subtracted) from the mixed signal received in "Part 1", thereby obtaining the useful signal in which no interference component is included.

It should be noted that, although the above functional modules of the terminal device 600 are illustrated in FIG. 6, the present disclosure is not limited thereto. The terminal device 600 may include more or fewer modules than those shown in FIG. 6, depending on the actual applications and design requirements.

As described above in connection with embodiments, the technical solution of the present disclosure can design a downlink transmission strategy at the base station side according to information such as the number of antennas of each base station and each terminal device in a communication scenario of asymmetric channel, so as to achieve the effect that the terminal device located at the edge of a cell is capable of canceling the interference of neighboring base stations when receiving signal. In addition, the technical solution of the present disclosure has no limitation on the number of antennas of each base station and each terminal device.

The technology of the present disclosure can be applied to various products. For example, the base station in the above-discussed embodiments may be implemented as a main body device (a base station device) that controls wireless communication at the base station side or a fully assembled base station. The base station can be implemented as any type of evolved Node B (eNB), such as macro eNB and small eNB. The small eNB may be an eNB covering a cell smaller than the macro cell, such as pico eNB, micro eNB, and home (femto) eNB. Alternatively, the base station can be implemented as another type of base station, such as NodeB and base transceiver station (BTS). The base station may include: a main body (also referred to as base station device) configured to control wireless communication; and one or more remote radio heads (RRHs) disposed at a different location from the main body. In addition, various types of terminal devices which will be described below can also operate as a base station by performing functions of the base station temporarily or semi-persistently.

For example, the terminal device in the above-discussed embodiments may be implemented as a mobile terminal (such as smart phone, tablet personal computer (PC), notebook PC, portable game terminal, portable/dongle type mobile router, and digital camera device.), or an in-vehicle terminal (such as car navigation device). The terminal device can also be implemented as a terminal that performs machine-to-machine (M2M) communication (also referred to as machine type communication (MTC) terminal). Further, the terminal device may also be a wireless communication module installed on each of the above terminals (such as integrated circuit module including a single wafer).

Furthermore, the processing unit in the above-discussed embodiments may be implemented as a baseband processor or a combination of a baseband processor and a general purpose processor, for example, a central processing unit (CPU) or a digital signal processor (DSP).

Figure 7:
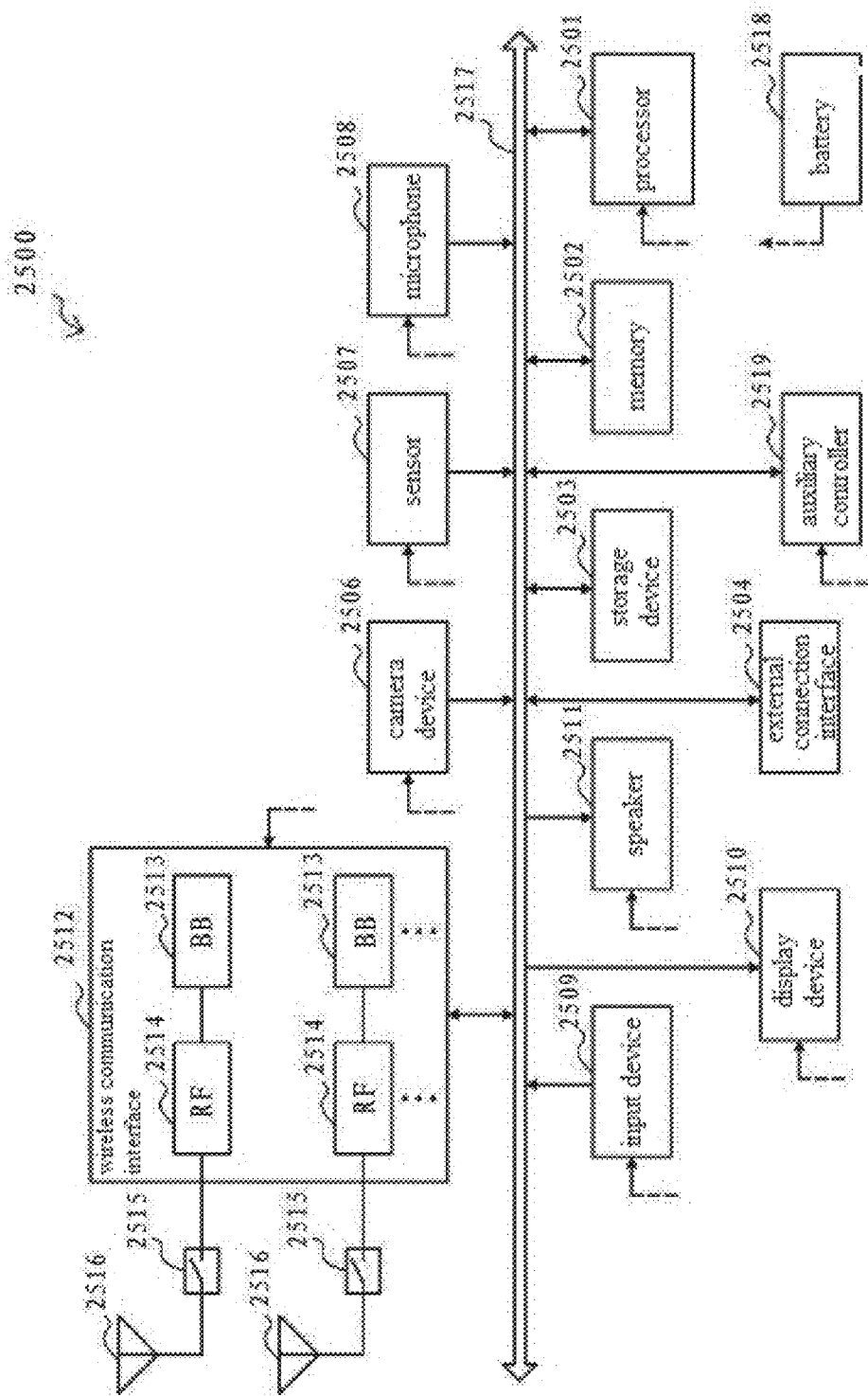
FIG. 7 shows a schematic configuration block diagram of a smart phone as an example of a terminal device.

The following describes the implementation of a terminal device in conjunction with FIG. 7, taking a smart phone as an example.

FIG. 7 shows a block diagram of schematic configuration of a smart phone. As shown in FIG. 7, the smart phone 2500 includes a processor 2501, a memory 2502, a storage device 2503, an external connection interface 2504, a camera device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a system on chip (SoC), and control functions of the application layer and other layers of the smart phone 2500. The memory 2502 includes a RAM and a ROM, and stores data and programs executed by the processor 2501. The storage device 2503 may include a storage medium such as semiconductor memory and hard disk. The external connection interface 2504 is an interface for connecting an external device (such as memory card and universal serial bus (USB) device) to the smart phone 2500.

The camera device 2506 includes an image sensor (such as charge coupled device (CCD) and complementary metal oxide semiconductor (CMOS)), and generates the captured image. The sensor 2507 may include a set of sensors, such as measurement sensor, gyro sensor, geomagnetic sensor, and acceleration sensor. The microphone 2508 converts the sound input to the smart phone 2500 into audio signal. The input device 2509 includes, for example, a touch sensor configured to detect a touch on the screen of the display device 2510, a keypad, a keyboard, a button, or a switch, and receives operation or information input from a user. The display device 2510 includes a screen (such as liquid crystal display (LCD) and organic light emitting diode (OLED) display), and displays an output image of the smart phone 2500. The speaker 2511 converts the audio signal output from the smart phone 2500 into sound.

The wireless communication interface 2512 supports any cellular communication schemes (such as LTE and LTE-Advanced) and performs wireless communication. The wireless communication interface 2512 may generally include for example a baseband (BB) processor 2513 and a radio frequency (RF) circuit 2514. The BB processor 2513 may perform encoding/decoding, modulation/demodulation, and multiplexing/demultiplexing for example, and perform various types of signal processing for wireless communication. Meanwhile, the RF circuit 2514 may include for example a mixer, a filter, and an amplifier, and transmit and receive wireless signal via the antenna 2516. The wireless communication interface 2512 may be a chip module on which the BB processor 2513 and the RF circuit 2514 are integrated. As shown in FIG. 7, the wireless communication interface 2512 may include a plurality of BB processors 2513 and a plurality of RF circuits 2514. However, the wireless communication interface 2512 may also include a single BB processor 2513 or a single RF circuit 2514.

Furthermore, in addition to the cellular communication scheme, the wireless communication interface 2512 may support different types of wireless communication schemes, such as short-range wireless communication scheme, near field communication scheme, and wireless local area network (LAN) scheme. In this case, the wireless communication interface 2512 may include the BB processor 2513 and the RF circuit 2514 for each wireless communication scheme.

Each of the antenna switches 2515 switches a connection destination for the antenna 2516 among a plurality of circuits (such as circuits for different wireless communication schemes) included in the wireless communication interface 2512.

Each of the antennas 2516 includes a single antenna element or a plurality of antenna elements (such as a plurality of antenna elements included in a MIMO antenna), and is used by the wireless communication interface 2512 to transmit and receive wireless signals. As shown in FIG. 7, the smart phone 2500 may include a plurality of antennas 2516. However, the smart phone 2500 may also include a single antenna 2516.

In addition, the smart phone 2500 may include the antenna 2516 for each wireless communication scheme. In this case, the antenna switch 2515 may be omitted from the configuration of the smart phone 2500.

The bus 2517 connects the processor 2501, the memory 2502, the storage device 2503, the external connection interface 2504, the camera device 2506, the sensor 2507, the microphone 2508, the input device 2509, the display device 2510, the speaker 2511, the wireless communication interface 2512, and the auxiliary controller 2519 to each other. The battery 2518 provides power to various components of the smart phone 2500 via a feeder, which is partially shown as dashed lines in the figure. The auxiliary controller 2519 controls the minimum essential function of the smart phone 2500, for example, in a sleep mode.

In the smart phone 2500 shown in FIG. 7, the transceiver device of the terminal device may be implemented by the wireless communication interface 2512. At least a portion of the functions of the various components of the terminal device may also be implemented by the processor 2501 or the auxiliary controller 2519. For example, a portion of the functions of the processor 2501 may be performed by the auxiliary controller 2519 to reduce the power consumption of the battery 2518. Furthermore, the processor 2501 or the auxiliary controller 2519 may perform at least a portion of the functions of various components of the terminal device by executing the program stored in the memory 2502 or the storage device 2503.

The implementation of the base station is described below in conjunction with FIG. 8, taking the eNB as an example.

Figure 8:
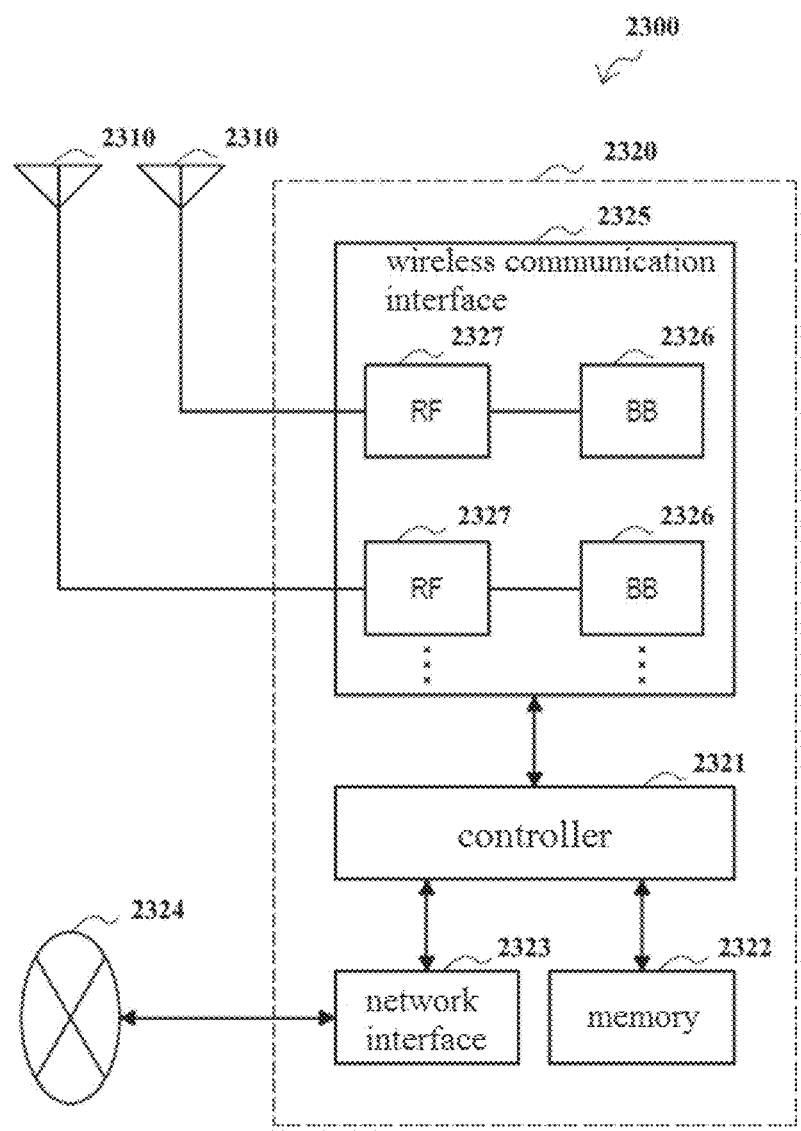
FIG. 8 shows a schematic configuration block diagram of an eNB as an example of a base station.

FIG. 8 shows a block diagram of schematic configuration of an eNB. As shown in FIG. 8, the eNB 2300 includes one or more antenna(s) 2310 and base station device(s) 2320. The base station device 2320 and each antenna 2310 may be connected to each other via radio frequency (RF) cable.

Each of the antennas 2310 includes a single antenna element or a plurality of antenna elements (such as a plurality of antenna elements included in a multiple input multiple output (MIMO) antenna), and is used by the base station device 2320 to transmit and receive wireless signals. As shown in FIG. 8, the eNB 2300 may include a plurality of antennas 2310. For example, the plurality of antennas 2310 may be compatible with the plurality of frequency bands used by the eNB 2300. Although FIG. 8 illustrates an example in which the eNB 2300 includes a plurality of antennas 2310, the eNB 2300 may include a single antenna 2310.

The base station device 2320 includes a controller 2321, a memory 2322, a network interface 2323, and a wireless communication interface 2325.

The controller 2321 may be for example a CPU or a DSP, and controls various functions of upper layers of the base station device 2320. For example, the controller 2321 generates data packets based on data in the signal processed by the wireless communication interface 2325 and delivers the generated packets via the network interface 2323. The controller 2321 may bundle the data from a plurality of baseband processors to generate the bundled packets and deliver the generated bundled packets. The controller 2321 may have a logical function that performs control such as radio resource control, radio bearer control, mobility management, admission control, and scheduling. The control may be performed in cooperation with nearby eNBs or core network nodes. The memory 2322 includes a RAM and a ROM, and stores programs executed by the controller 2321 and various types of control data (such as terminal list, transmission power data, and scheduling data).

The network interface 2323 is a communication interface for connecting the base station device 2320 to the core network 2324. The controller 2321 may communicate with core network nodes or another eNB via the network interface 2323. In this case, the eNB 2300 and the core network nodes or other eNBs may be connected to each other through a logical interface (such as S1 interface and X2 interface). The network interface 2323 may also be a wired communication interface or a wireless communication interface for wireless backhaul lines. If the network interface 2323 is a wireless communication interface, the network interface 2323 can use a higher frequency band for wireless communication than the frequency band used by the wireless communication interface 2325.

The wireless communication interface 2325 supports any cellular communication schemes (such as Long Term Evolution (LTE) and LTE-Advanced), and provides wireless connections to terminals located in the cell of the eNB 2300 via the antenna 2310. The wireless communication interface 2325 may generally include for example a BB processor 2326 and a RF circuit 2327. The BB processor 2326 may perform for example encoding/decoding, modulation/demodulation, and multiplexing/demultiplexing, and perform various types of signal processing of the layers such as L1, Medium Access Control (MAC), Radio Link Control (RLC), and Packet Data Convergence Protocol (PDCP). Instead of the controller 2321, the BB processor 2326 may have some or all of the above logic functions. The BB processor 2326 may be a memory that stores communication control program, or a module that includes a processor and associated circuitry configured to execute the program. Updating program may change the functionality of the BB processor 2326. The module may be a card or a blade that is inserted into the slot of the base station device 2320. Alternatively, the module may also be a chip mounted on the card or the blade. Meanwhile, the RF circuit 2327 may include for example a mixer, a filter, and an amplifier, and transmit and receive wireless signals via the antenna 2310.

As shown in FIG. 8, the wireless communication interface 2325 may include a plurality of BB processors 2326. For example, the plurality of BB processors 2326 may be compatible with the plurality of frequency bands used by the eNB 2300. As shown in FIG. 8, the wireless communication interface 2325 may include a plurality of RF circuits 2327. For example, the plurality of RF circuits 2327 may be compatible with the plurality of antenna elements. Although FIG. 8 illustrates an example in which the wireless communication interface 2325 includes a plurality of BB processors 2326 and a plurality of RF circuits 2327, the wireless communication interface 2325 may include a single BB processor 2326 or a single RF circuit 2327.

In the eNB 2300 shown in FIG. 8, the transceiver device of the base station side device can be implemented by the wireless communication interface 2325. At least a portion of the functions of the various components may also be performed by the controller 2321. For example, the controller 2321 may perform at least a portion of the functions of the various components by executing a program stored in the memory 2322.

The various devices or modules described herein are only logical and do not strictly correspond to physical devices or entities. For example, the functionality of each of the modules described herein may be implemented by a plurality of physical entities, or the functionalities of the plurality of modules described herein may be implemented by a single physical entity. In addition, it should be noted that the features, components, elements, steps, and the like described in one embodiment are not limited to the embodiment, but may also be applied to another embodiment, for example, by replacing or combining with the specific features, components, elements, steps, and the like in the other embodiment.

A series of processes performed by each device or module in the above embodiments may be implemented by software, hardware, or a combination of software and hardware. The program included in the software may be stored in advance in a storage medium provided inside or outside each device. As an example, during execution, these programs are written to a random access memory (RAM) and executed by a processor (e.g., a CPU).

Figure 9:
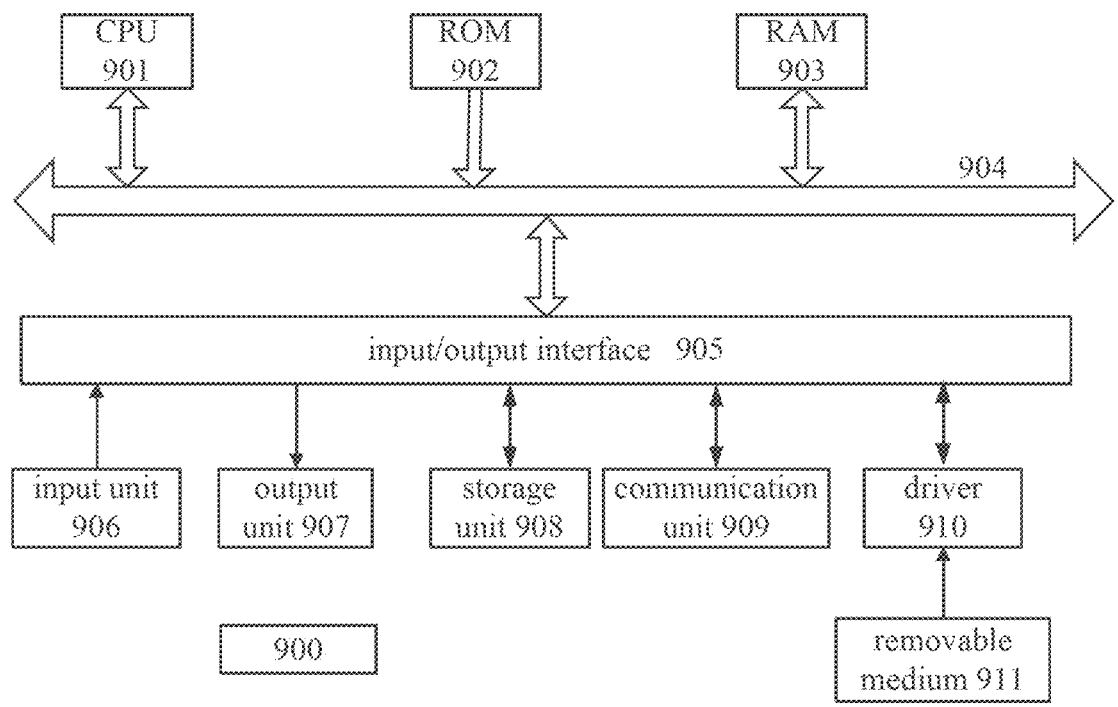
FIG. 9 shows a schematic configuration block diagram of computer hardware.

FIG. 9 is a schematic configuration block diagram showing a computer hardware that executes the above processing according to the program.

In the computer 900, a central processing unit (CPU) 901, a read only memory (ROM) 902, and a random access memory (RAM) 903 are connected to each other by a bus 904.

An input/output interface 905 is further connected to the bus 904. The input/output interface 905 is connected to the following components: an input unit 906 formed of keyboard, mouse, microphone, and the like; an output unit 907 formed of display, speaker, and the like; a storage unit 908 formed of hard disk, nonvolatile memory, and the like; a communication unit 909 formed of network interface card (such as local area network (LAN) card, modem, etc.); and a driver 910 that drives a removable medium 911 such as magnetic disk, optical disk, magneto-optical disk, or semiconductor memory.

In the computer having the above structure, the CPU 901 loads the program stored in the storage unit 908 into the RAM 903 via the input/output interface 905 and the bus 904, and executes the program to perform the above processing.

The program to be executed by a computer (CPU 901) may be recorded on the removable medium 911 which is a package medium. The package medium is for example formed of magnetic disk (including floppy disk), optical disk (including compact disk-read only memory (CD-ROM), digital versatile disk (DVD), etc.), magneto-optical disk, or semiconductor memory. Further, the program to be executed by the computer (CPU 901) may also be provided via a wired or wireless transmission medium such as local area network, Internet, or digital satellite broadcasting.

When the removable medium 911 is installed in the driver 910, the program may be installed in the storage unit 908 via the input/output interface 905. In addition, the program may be received by the communication unit 909 via a wired or wireless transmission medium, and the program is installed in the storage unit 908. Alternatively, the program may be pre-installed in the ROM 902 or the storage unit 908.

The program to be executed by the computer may be a program that performs processing in the order described in this specification, or may be a program that executes processing in parallel or performs processing when needed (such as when called).

The embodiments and the technical effects of the present disclosure have been described in detail above in conjunction with the accompanying drawings, but the scope of the present disclosure is not limited thereto. It will be appreciated by those skilled in the art that various modifications and variations can be made to the embodiments discussed herein without departing from the principle and spirit of the present disclosure, depending on the design requirements and other factors. The scope of the present disclosure is defined by the appended claims or their equivalents.

In addition, the present disclosure may also be configured as follows.

An electronic device for facilitating interference cancellation, comprising processing circuitry configured to: recognize a first terminal located within coverage of a first base station and adjacent to coverage of at least one second base station based on position information from one or more terminals served by the first base station, wherein the first terminal served by the first base station can receive an interference signal from the at least one second base station, and wherein a second terminal exists within coverage of each of the at least one second base station, the second terminal being served by the corresponding second base station and away from the coverage of the first base station; and perform control to cooperate with the at least one second base station, so as to determine a downlink transmission manner for the first terminal, such that the first terminal can receive a signal by performing interference cancellation.

A number of antennas of the first base station is greater than a number of antennas of the first terminal, and a number of antennas of the second base station is greater than or equal to twice a number of antennas of the second terminal served by it.

In a case of a single second base station, the processing circuitry is further configured to: determine a period of time based on a number of antennas of the first base station, a number of antennas of the first terminal acquired from the first terminal, a number of antennas of the second base station and a number of antennas of the corresponding second terminal acquired from the second base station; and control downlink transmission from the first base station to the first terminal based on the period of time, such that the first terminal receives only a signal from the second base station within the period of time.

In a case of more than one second base stations, the processing circuitry is further configured to: determine a plurality of periods of time based on the number of antennas of the first base station, the number of antennas of the first terminal acquired from the first terminal, the numbers of antennas of respective second base stations and the numbers of antennas of respective second terminals acquired from the more than one second base stations; and control downlink transmission from the first base station to the first terminal based on the plurality of periods of time, such that the first terminal receives only a signal from one of the more than one second base stations within each of the plurality of periods of time.

The processing circuitry is further configured to: perform control to notify each second base station of the number of antennas of the first base station and the number of antennas of the first terminal, such that each second base station can determine a period of time corresponding thereto, so as to transmit a signal in the corresponding period of time, wherein the signal received by the first terminal within each period of time is at least partially the same as a signal which was transmitted by the second base station transmitting said received signal to the second terminal served by it within another period of time prior to the period of time.

The processing circuitry is further configured to: generate indication information to be notified to the first terminal, which information indicates a reception manner for the first terminal, wherein the reception manner comprises at least one of the determined period of time and an antenna mode to be used by the first terminal.

The electronic device is implemented as a component of the first base station.

An apparatus for facilitating interference cancellation, comprising: a plurality of antennas configured to transmit and receive signals; and processing circuitry configured to: recognize a first terminal located within coverage of a first base station and adjacent to coverage of at least one second base station based on position information from one or more terminals served by the first base station, wherein the first terminal served by the first base station can receive an interference signal from the at least one second base station, and wherein a second terminal exists within coverage of each of the at least one second base station, the second terminal being served by the corresponding second base station and away from the coverage of the first base station; and perform control to cooperate with the at least one second base station, so as to determine a downlink transmission manner for the first terminal, such that the first terminal can receive a signal by performing interference cancellation.

A number of antennas of the first base station is greater than a number of antennas of the first terminal, and a number of antennas of the second base station is greater than or equal to twice a number of antennas of the corresponding second terminal.

In a case of a single second base station, the processing circuitry is further configured to: perform control to acquire, via the plurality of antennas, a number of antennas of the first terminal from the first terminal and acquire a number of antennas of the second base station and a number of antennas of the corresponding second terminal from the second base station; determine a period of time based on a number of antennas of the first base station, the number of antennas of the first terminal, the number of antennas of the second base station and the number of antennas of the second terminal; and control downlink transmission from the first base station to the first terminal based on the period of time, such that the first terminal receives only a signal from the second base station within the period of time.

In a case of more than one second base stations, the processing circuitry is further configured to: perform control to acquire, via the plurality of antennas, a number of antennas of the first terminal from the first terminal and acquire numbers of antennas of respective second base stations and numbers of antennas of respective second terminals from the more than one second base stations; determine a plurality of periods of time based on a number of antennas of the first base station, the number of antennas of the first terminal, the numbers of antennas of respective second base stations and the numbers of antennas of respective second terminals; and control downlink transmission from the first base station to the first terminal based on the plurality of periods of time, such that the first terminal receives only a signal from one of the more than one second base stations within each of the plurality of periods of time.

The processing circuitry is further configured to: perform control to notify each second base station of the number of antennas of the first base station and the number of antennas of the first terminal, such that each second base station can determine a period of time corresponding thereto, so as to transmit a signal in the corresponding period of time, wherein the signal received by the first terminal within each period of time is at least partially the same as a signal which was transmitted by the second base station transmitting said received signal to the second terminals served by it within another period of time prior to the period of time.

The processing circuitry is further configured to: generate indication information to be notified to the first terminal, which information indicates a reception manner for the first terminal, wherein the reception manner comprises at least one of the determined period of time and an antenna mode to be used by the first terminal.

The apparatus is implemented as the first base station.

A method performed by a first base station for facilitating interference cancellation, comprising: receiving position information from one or more terminals served by the first base station; recognizing a first terminal located within coverage of the first base station and adjacent to coverage of at least one second base station based on the received position information, wherein the first terminal served by the first base station can receive an interference signal from the at least one second base station, and wherein a second terminal exists within coverage of each of the at least one second base station, the second terminal being served by the corresponding second base station and away from the coverage of the first base station; and cooperating with the at least one second base station, so as to determine a downlink transmission manner for the first terminal, such that the first terminal can receive a signal by performing interference cancellation.

A number of antennas of the first base station is greater than a number of antennas of the first terminal, and a number of antennas of the second base station is greater than or equal to twice a number of antennas of the corresponding second terminal.

The method further comprises: acquiring a number of antennas of the first terminal from the first terminal; acquiring a number of antennas of the least one second base station and a number of antennas of the at least one second terminal from the at least one second base station; determining at least one period of time based on a number of antennas of the first base station, the number of antennas of the first terminal, the number of antennas of the at least one second base station and the number of antennas of the at least one second terminal; and controlling downlink transmission to the first terminal based on the at least one period of time, such that the first terminal receives only a signal from one of the at least one second base station within each of the at least one period of time.

An electronic device for interference cancellation, comprising processing circuitry configured to: perform control to report, to a first base station serving a first terminal, position information and a number of antennas of the first terminal; and determine a reception manner to be used by the first terminal and control the first terminal to perform interference cancellation processing, according to indication information from the first base station, wherein the indication information is generated by the first base station based on at least the position information and the number of antennas of the first terminal, wherein the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station.

A number of antennas of the first base station is greater than the number of antennas of the first terminal, and a number of antennas of the second base station is greater than or equal to twice a number of antennas of the second terminal served by it.

In a case of a single second base station, the processing circuitry is further configured to: control the first terminal to receive a signal by switching different antenna modes within a first period of time indicated by the indication information, wherein the signal received within the first period of time comprises a signal from the first base station and a signal from the second base station; control the first terminal to receive, within a second period of time indicated by the indication information, a signal using antenna modes corresponding to those used within the first period of time, wherein the signal received within the second period of time comprises only the signal from the second base station; and process the signal received within the first period of time using the signal received within the second period of time.

In a case of more than one second base stations, the processing circuitry is further configured to: control the first terminal to receive a signal by switching different antenna modes within a first period of time indicated by the indication information, wherein the signal received within the first period of time comprises a signal from the first base station and signals from the more than one second base stations; control the first terminal to receive, within each of a plurality of second periods of time indicated by the indication information, a signal using antenna modes corresponding to those used within the first period of time, wherein the signal received within each of the plurality of second periods of time comprises only a signal from one of the more than one second base stations; and process the signal received within the first period of time using the signals received within the plurality of second periods of time.

The processing circuitry is further configured to cancel the signal received within the second period of time from the signal received within the first period of time, and recover data based on the resulted signal.

The signal received within each of the second periods of time is at least partially the same as a signal which was transmitted by the second base station transmitting said received signal to the second terminal served by it within the first period of time.

The electronic device is implemented as a component of the first terminal.

An apparatus for interference cancellation, comprising: a plurality of antennas configured to be capable of transmitting and receiving signals in a plurality of antenna modes; and processing circuitry configured to: perform control to report, to a first base station serving a first terminal, position information and a number of antennas of the first terminal; and determine a reception manner to be used by the first terminal and control the first terminal to perform interference cancellation processing, according to indication information from the first base station, wherein the indication information is generated by the first base station based on at least the position information and the number of antennas of the first terminal, wherein the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station.

A number of antennas of the first base station is greater than the number of antennas of the first terminal, and a number of antennas of the second base station is greater than or equal to twice a number of antennas of the second terminal served by it.

In a case of a single second base station, the processing circuitry is further configured to: control the first terminal to receive a signal by switching different antenna modes within a first period of time indicated by the indication information, wherein the signal received within the first period of time comprises a signal from the first base station and a signal from the second base station; control the first terminal to receive, within a second period of time indicated by the indication information, a signal using antenna modes corresponding to those used within the first period of time, wherein the signal received within the second period of time comprises only the signal from the second base station; and process the signal received within the first period of time using the signal received within the second period of time.

In a case of more than one second base stations, the processing circuitry is further configured to: control the first terminal to receive a signal by switching different antenna modes within a first period of time indicated by the indication information, wherein the signal received within the first period of time comprises a signal from the first base station and signals from the more than one second base stations; control the first terminal to receive, within each of a plurality of second periods of time indicated by the indication information, a signal using antenna modes corresponding to those used within the first period of time, wherein the signal received within each of the plurality of second periods of time comprises only a signal from one of the more than one second base stations; and process the signal received within the first period of time using the signal received within the plurality of second periods of time.

The processing circuitry is further configured to cancel the signal received within the second period of time from the signal received within the first period of time, and recover data based on the resulted signal.

The number of antennas of the first terminal is different from a number of antennas of the second terminal.

The first period of time and the second period of time are determined by the first base station based on a number of antennas of the first base station, the number of antennas of the first terminal, a number of antennas of the at least one second base station and a number of antennas of the at least one second terminal.

The apparatus is implemented as the first terminal.

A method performed by a first terminal for interference cancellation, comprising: reporting, to a first base station serving the first terminal, position information and a number of antennas of the first terminal; receiving indication information from the first base station; and determining a reception manner to be used by the first terminal and performing interference cancellation processing, according to the indication information, wherein the indication information is generated by the first base station based on at least the position information and the number of antennas of the first terminal, and wherein the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station.

A number of antennas of the first base station is greater than the number of antennas of the first terminal, and a number of antennas of the second base station is greater than or equal to twice a number of antennas of the second terminal served by it.

The method further comprises: receiving a signal by switching different antenna modes within a first period of time indicated by the indication information, wherein the signal received within the first period of time comprises a signal from the first base station and a signal from the at least one second base station; receiving, within each of at least one second period of time indicated by the indication information, a signal using antenna modes corresponding to those used within the first period of time, wherein the signal received within each of the at least one second period of time comprises only a signal from one of the at least one second base station; and processing the signal received within the first period of time using the signal received within the at least one second period of time.

The method further comprises: cancelling the signal received within the at least one second period of time from the signal received within the first period of time, and recovering data based on the resulted signal.

The number of antennas of the first terminal is different from a number of antennas of the second terminal.

The invention claimed is:

1. An electronic device for facilitating interference cancellation, comprising
processing circuitry configured to:
recognize a first terminal located within coverage of a first base station and adjacent to coverage of at least one second base station based on position information from one or more terminals served by the first base station, wherein the first terminal served by the first base station can receive an interference signal from the at least one second base station, and wherein a second terminal exists within coverage of each of the at least one second base station, the second terminal being served by the corresponding second base station and away from the coverage of the first base station; and
perform control to cooperate with the at least one second base station, so as to determine a downlink transmission manner for the first terminal, such that the first terminal can receive a signal by performing interference cancellation, wherein
in a case where a number of the at least one second base station is one, the processing circuitry is further configured to:
determine a first period of time based on a number of antennas of the first base station, a number of antennas of the first terminal acquired from the first terminal, a number of antennas of the second base station and a number of antennas of the corresponding second terminal acquired from the second base station; and
control downlink transmission from the first base station to the first terminal based on the first period of time, such that the first terminal receives only a signal from the second base station within the first period of time.

2. The electronic device according to claim 1, wherein a number of antennas of the first base station is greater than a number of antennas of the first terminal, and a number of antennas of the second base station is greater than or equal to twice a number of antennas of the second terminal served by it.

3. The electronic device according to claim 1, wherein, in a case where a number of the at least one second base station is more than one, the processing circuitry is further configured to:
determine a plurality of periods of time based on a number of antennas of the first base station, a number of antennas of the first terminal acquired from the first terminal, numbers of antennas of each of the more than one second base stations, and numbers of antennas of each of the corresponding second terminal acquired from the more than one second base stations; and
control downlink transmission from the first base station to the first terminal based on the plurality of periods of time, such that the first terminal receives only a signal from one of the more than one second base stations within each of the plurality of periods of time.

4. The electronic device according to claim 1, wherein the processing circuitry is further configured to:
perform control to notify each of the at least one second base station of the number of antennas of the first base station and the number of antennas of the first terminal, such that each of the at least one second base station can determine each second period of time, so as to transmit a signal in the each second period of time, wherein
the signal received by the first terminal within the each second period of time is at least partially the same as a signal which was transmitted by the second base station transmitting said received signal to the second terminal served by the second base station within a third period of time prior to the each second period of time.

5. The electronic device according to claim 1, wherein the processing circuitry is further configured to:
generate indication information to be notified to the first terminal, which information indicates a reception manner for the first terminal, wherein
the reception manner comprises at least one of the first period of time and an antenna mode to be used by the first terminal.

6. A method performed by a first base station for facilitating interference cancellation, comprising:
receiving position information from one or more terminals served by the first base station;

recognizing, using processing circuitry: a first terminal located within coverage of the first base station and adjacent to coverage of at least one second base station based on the received position information, wherein the first terminal served by the first base station can receive an interference signal from the at least one second base station, and wherein a second terminal exists within coverage of each of the at least one second base station, the second terminal being served by the corresponding second base station and away from the coverage of the first base station; and cooperating, using the processing circuitry, with the at least one second base station, so as to determine a downlink transmission manner for the first terminal, such that the first terminal can receive a signal by performing interference cancellation, wherein in a case where a number of the at least one second base station is one, the method further comprises:

determining, using the processing circuitry, a period of time based on a number of antennas of the first base station, a number of antennas of the first terminal acquired from the first terminal, a number of antennas of the second base station and a number of antennas of the corresponding second terminal acquired from the second base station; and controlling, using the processing circuitry, downlink transmission from the first base station to the first terminal based on the period of time, such that the first terminal receives only a signal from the second base station within the period of time.

7. An electronic device for interference cancellation, comprising processing circuitry configured to:

perform control to report, to a first base station sewing a first terminal, position information and a number of antennas of the first terminal; and determine a reception manner to be used by the first terminal and control the first terminal to perform interference cancellation processing, according to indication information from the first base station, wherein the indication information is generated by the first base station based on at least the position information and the number of antennas of the first terminal, the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station, and in a case where a number of the at least one second base station is one, the processing circuitry is further configured to:

control the first terminal to receive a signal by switching different antenna modes within a first period of time indicated by the indication information, wherein the signal received within the first period of time comprises a signal from the first base station and a signal from the second base station;

control the first terminal to receive, within a second period of time indicated by the indication information, a signal using antenna modes corresponding to those used within the first period of time wherein the signal received within the second period of time comprises only the signal from the second base station; and process the signal received within the first period of time using the signal received within the second period of time.

8. The electronic device according to claim 7, wherein a number of antennas of the first base station is greater than the number of antennas of the first terminal, and a number of antennas of the second base station g at than or equal to twice a number of antennas of the second terminal served by it.

9. The electronic device according to claim 7, wherein, in a case where a number of the at least one second base station is more than one, the processing circuitry is further configured to:

control the first terminal to receive a signal by switching different antenna modes within a first period of time indicated by the indication information, wherein the signal received within the first period of time comprises a signal from the first base station and signals from the more than one second base stations;

control the first terminal to receive, within each of a plurality of second periods of time indicated by the indication information, a signal using antenna modes corresponding to those used within the first period of time, wherein the signal received within each of the plurality of second periods of time comprises only a signal from one of the more than one second base stations; and process the signal received within the first period of time using the signals received within the plurality of second periods of time.

10. The electronic device according to claim 7, wherein the processing circuitry is further configured to cancel the signal received within the second period of time from the signal received within the first period of time, and recover data based on the resulted signal.

11. The electronic device according to claim 7, wherein the signal received within each of the second periods of time is at least partially the same as a signal which was transmitted by the second base station transmitting said received signal to the second terminal served by it within the first period of time.

12. An apparatus for interference cancellation, comprising:

a plurality of antennas configured to be capable of transmitting and receiving signals in a plurality of antenna modes; and processing circuitry configured to:

perform control to report, to a first base station serving a first terminal, position information and a number of antennas of the first terminal; and determine a reception manner to be used by the first terminal and control the first terminal to perform interference cancellation processing, according to indication information from the first base station, wherein the indication information is generated by the first base station based on at least the position information and the number of antennas of the first terminal, the first terminal is located within coverage of the first base station and adjacent to coverage of at least one second base station, and can receive an interference signal from the at least one second base station, wherein a second terminal exists within coverage of each of the at least one second base station, the second terminal being served by the corresponding second base station and away from the coverage of the first base station, and in a case where a number of the at least one second base station is one, the processing circuitry is further configured to:
control the first terminal to receive a signal by switching different antenna modes within a first period of time indicated by the indication information, wherein the signal received within the first period of time comprises a signal from the first base station and a signal from the second base station;
control the first terminal to receive, within a second period of time indicated by the indication information, a signal using antenna modes corresponding to those used within the first period of time, wherein the signal received within the second period of time comprises only the signal from the second base station; and
process the signal received within the first period of time using the signal received within the second period of time.

13. The apparatus according to claim 12, wherein a number of antennas of the first base station is greater than the number of antennas of the first terminal, and a number of antennas of the second base station is greater than or equal to twice a number of antennas of the second terminal served by it.

14. The apparatus according to claim 12, wherein, in a case where a number of the at least one second base station is more than one, the processing circuitry is further configured to:
control the first terminal to receive a signal by switching different antenna modes within a first period of time indicated by the indication information, wherein the signal received within the first period of time comprises a signal from the first base station and signals from the more than one second base stations;
control the first terminal to receive, within each of a plurality of second periods of time indicated by the indication information, a signal using antenna modes corresponding to those used within the first period of time, wherein the signal received within each of the plurality of second periods of time comprises only a signal from one of the more than one second base stations; and
process the signal received within the first period of time using the signals received within the plurality of second periods of time.

15. The apparatus according to 25, wherein the number of antennas of the first terminal is different from a number of antennas of the second terminal.

16. The apparatus according to claim 12, wherein the first period of time and the second period of time are determined by the first base station based on a number of antennas of the first base station, the number of antennas of the first terminal, a number of antennas of the at least one second base station and a number of antennas of the at least one second terminal.

17. The apparatus according to claim 12, wherein the apparatus is implemented as the first terminal.

* * * * *